US006870859B1

(12) United States Patent
Kozaki et al.

(10) Patent No.: US 6,870,859 B1
(45) Date of Patent: Mar. 22, 2005

(54) MULTIPLEXING SYSTEM AND MULTIPLEXING METHOD OF TRIBUTARY SIGNALS

(75) Inventors: Seiji Kozaki, Tokyo (JP); Kazuo Kubo, Tokyo (JP); Hiroshi Ichibangase, Tokyo (JP); Eiichi Shibano, Tokyo (JP); Tadami Yasuda, Tokyo (JP)

(73) Assignees: KDD Corporation, Tokyo (JP); KDD Submarine Cable Systems, Inc., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,264

(22) Filed: Mar. 3, 2000

(30) Foreign Application Priority Data

Mar. 4, 1999 (JP) .......................................... 11-057360

(51) Int. Cl.⁷ .................................................. H04J 3/04
(52) U.S. Cl. ...................................................... 370/535
(58) Field of Search ................................ 370/535–540, 370/357, 463, 469, 503, 468, 474–479, 376, 386–395, 220, 250, 217–228, 222, 248, 506, 238, 466, 465, 358–360, 401, 498–509, 545, 537, 607, 512; 714/776, 800, 738; 348/14.01, 14.02; 398/98

(56) References Cited

U.S. PATENT DOCUMENTS

| 4,914,655 A | * | 4/1990 | Johannes et al. | ........... 370/540 |
| 5,185,736 A | * | 2/1993 | Tyrrell et al. | ............... 370/358 |
| 5,287,513 A | * | 2/1994 | Ferguson | ..................... 370/360 |
| 5,343,240 A | * | 8/1994 | Yu | ............................... 348/14 |
| 5,754,527 A | * | 5/1998 | Fujita | ......................... 370/217 |
| 6,058,119 A | * | 5/2000 | Engbersen et al. | ......... 370/466 |
| 6,094,737 A | * | 7/2000 | Fukasawa | .................... 714/738 |
| 6,125,104 A | * | 9/2000 | Shiragaki et al. | ........... 370/216 |
| 6,208,657 B1 | * | 3/2001 | Dendi et al. | ................ 370/401 |

FOREIGN PATENT DOCUMENTS

| EP | 0403663 A1 | 12/1990 |
| JP | A4278744 | 10/1992 |
| JP | A6350567 | 12/1994 |
| JP | A758717 | 3/1995 |
| JP | A5344089 | 12/1996 |

OTHER PUBLICATIONS

"Network Node Interface," Part 1, vol. 3 of the Telecommunication technology Committee (TTC Standard), ITU–T Recommendations G. 707–709 (Fig. 3–1/JT–G709 in Network Node Transmission System) Ver. 6.

* cited by examiner

Primary Examiner—Chi Pham
Assistant Examiner—Prenell Jones
(74) Attorney, Agent, or Firm—Birch, Stewart, Kolasch & Birch, LLP

(57) ABSTRACT

A multiplex transmission system of tributary signals multiplexes a plurality of tributary signals after adding to them frame information common to all the tributary signals and identification codes different for the individual tributary signals. This makes it possible to solve a problem of a conventional multiplex system of tributary signals in that the transmission rate is limited because it multiplexes a plurality of tributary signals with adding an SOH (section overhead) to generate an STM-N frame to be transmitted and received, which requires a considerable time.

23 Claims, 25 Drawing Sheets

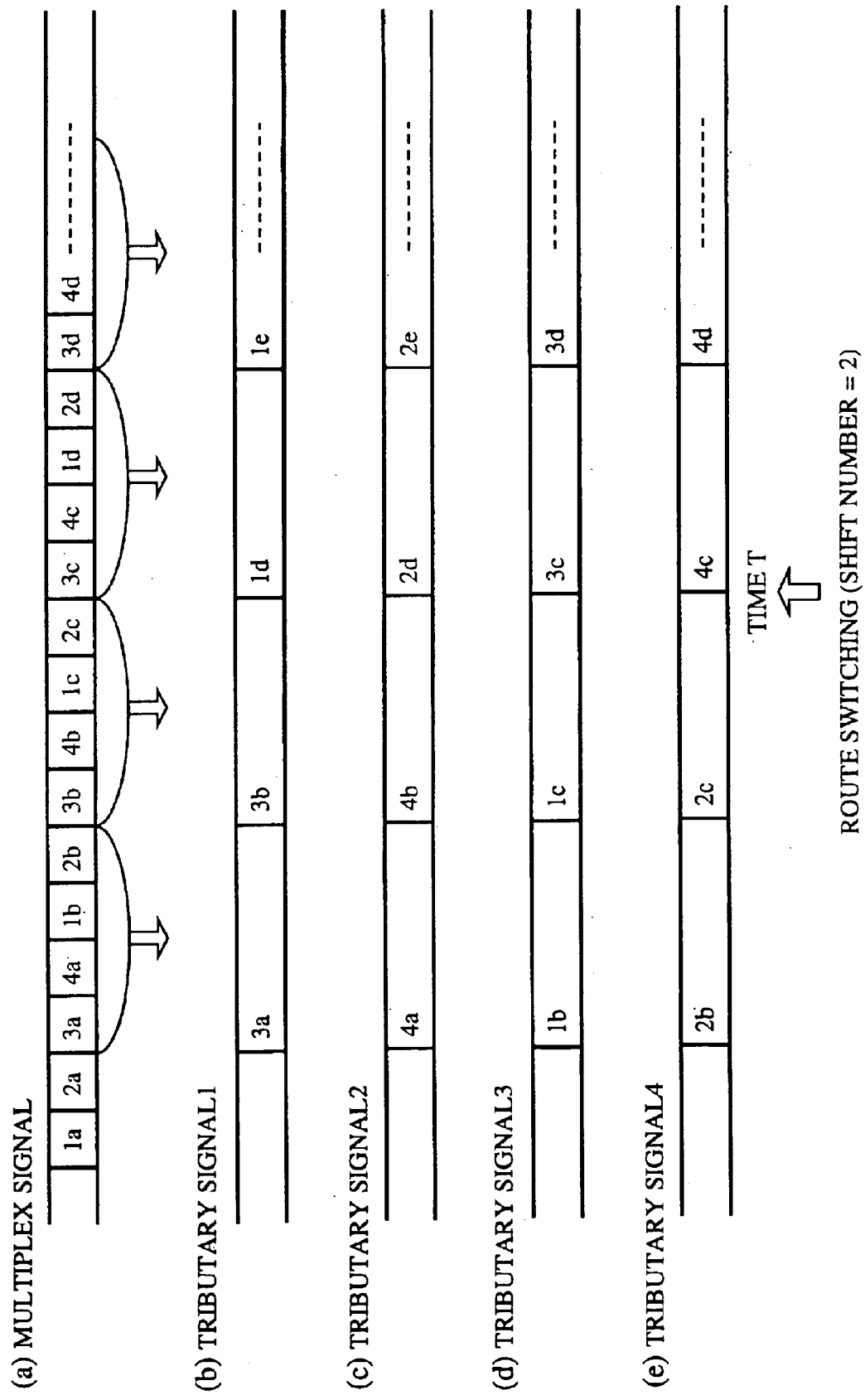

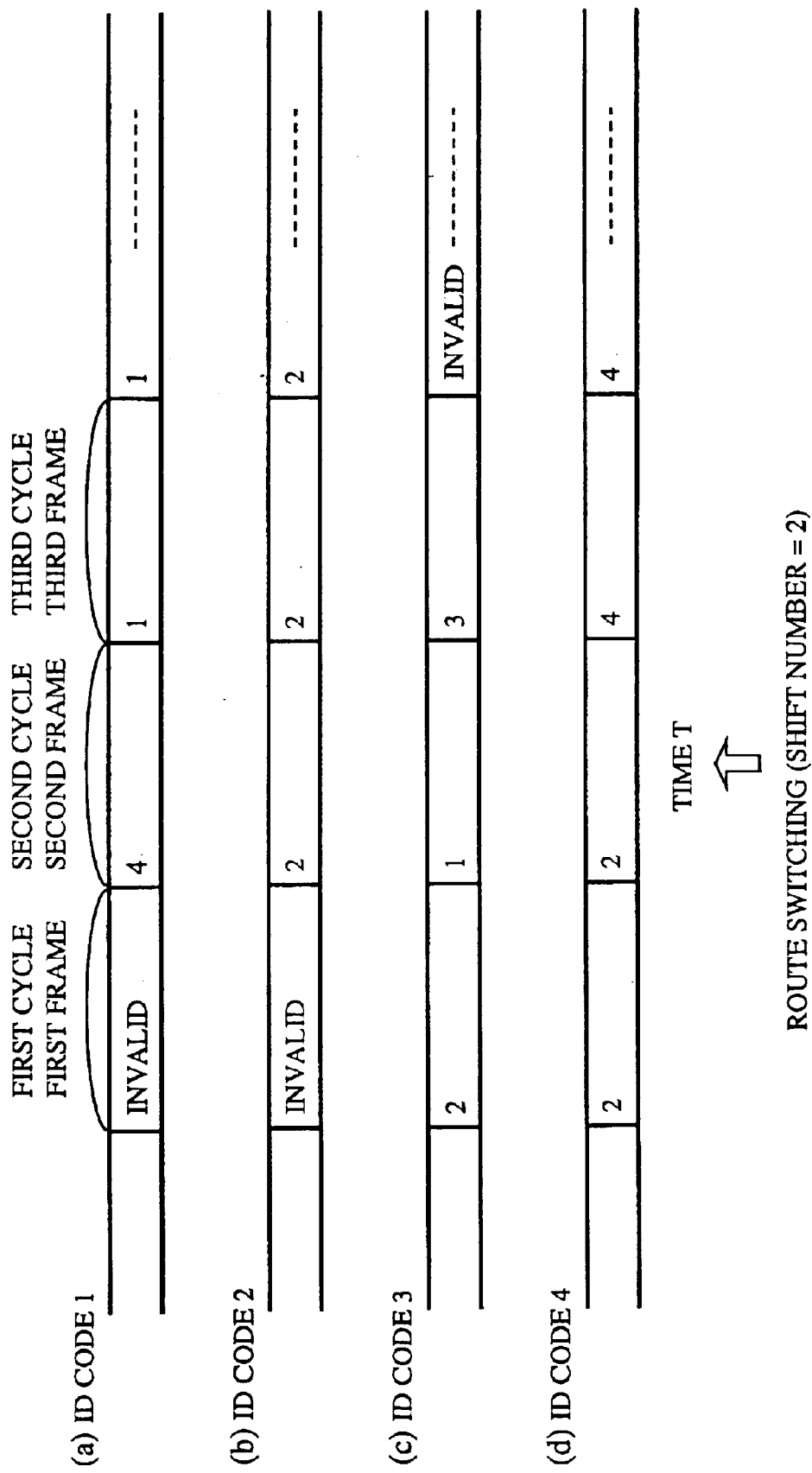

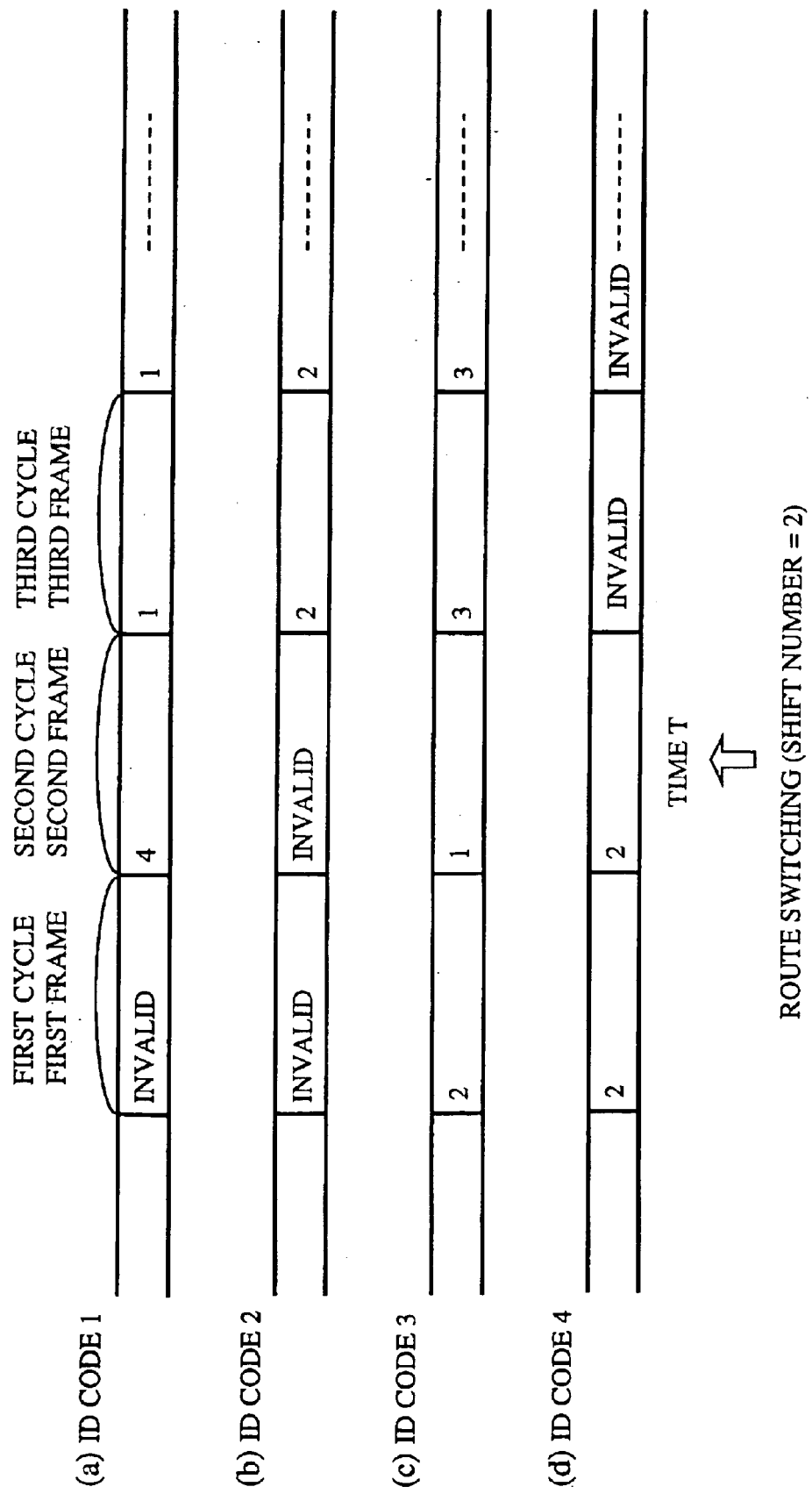

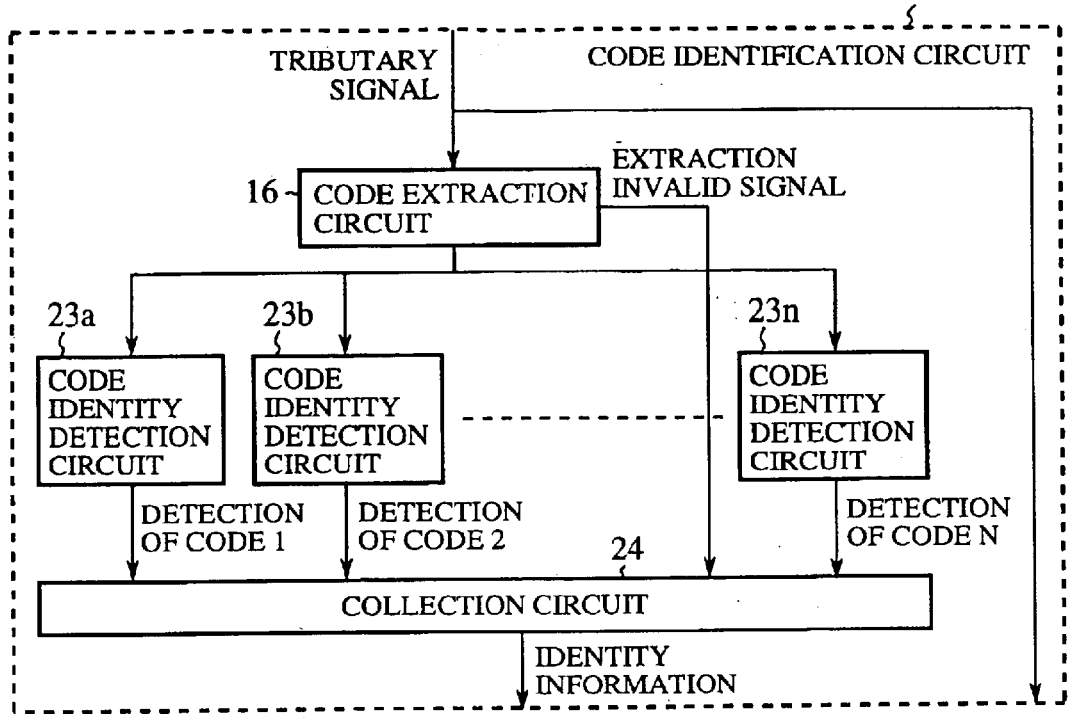
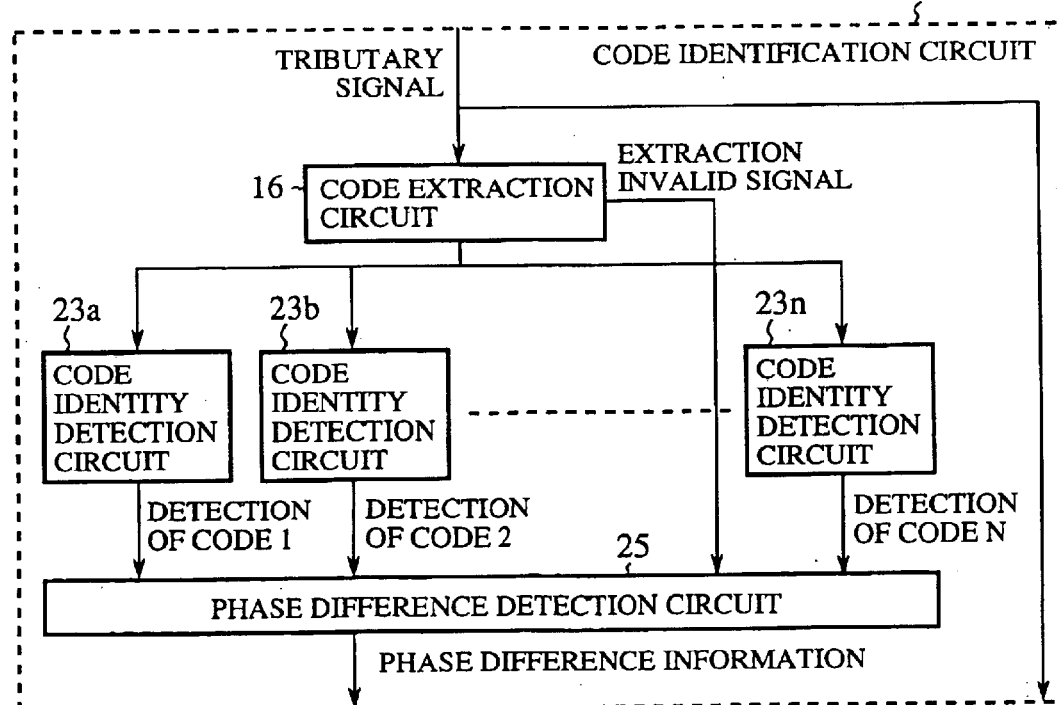

MULTIPLEXING SYSTEM AND MULTIPLEXING METHOD OF TRIBUTARY SIGNALS

BACKGROUND OF THE INVENTION

1. Field of the Invention

The present invention relates to a multiplexing system and multiplexing method of tributary signals between a plurality of upstream signal paths and a plurality of downstream signal paths corresponding to the individual upstream signal paths for multiplexing a plurality of tributary signals transmitted through the plurality of signal paths to be transmitted through a single signal path, and more particularly to a multiplexing system and multiplexing method of tributary signals that can implement a higher transmission rate than Synchronous Digital Hierarchy (SDH) systems based on the virtual container multiplexing currently utilized as Network Node Interfaces (NNIs) in the ATM (Asynchronous Transfer Mode), and that can preferably be applied to the Network Node Interfaces serving as ATM network high ends such as international node interfaces using optical cables.

2. Description of Related Art

FIG. 29 is a block diagram showing a configuration of a conventional Synchronous Digital Hierarchy system based on the virtual container multiplexing. In this figure, the reference numeral 1 designates a transmitter for multiplexing a plurality of tributary signals supplied from a plurality of upstream transmission paths to be output; 2 designates a receiver for demultiplexing the multiplex signal to a plurality of tributary signals to be supplied to a plurality of downstream signal paths; and 3 designates an optical cable for transmitting the multiplex signal.

In the transmitter 1, each reference numeral 39 designates a transmission side tributary circuit having one-to-one correspondence with the upstream transmission path; 40 designates a multiplexer for multiplexing the plurality of tributary signals to create information payloads; and 41 designates a frame generating circuit for adding to the information payloads section overheads SOH including information on the destinations of the tributary signals, and for sending them to the optical cable 3. On the other hand, in the receiver 2, the reference numeral 42 designates a frame identification circuit for synchronizing and detecting frames and for decoding the section overheads SOH to be output as phase information and the like; 43 designates a demultiplexer for demultiplexing the plurality of tributary signals in accordance with the phase information to restore the tributary signals from the information payloads; and each reference numeral 44 designates a receiving side tributary circuit to which the demultiplexer distributes the tributary signals.

FIG. 30 is a diagram illustrating a structure of an STM-N (Synchronous Transport Module-N) frame adopted by the conventional Synchronous Digital Hierarchy system. The STM-N frame was recommended as a multiplexing structure of N AUGs (Administrative Unit Groups) by ITU-T Recommendations G.707–709 (FIG. 3-1/JT-G709 in Network Node Transmission System (Ver. 6) of "Network Node Interface", Part 1, Vol. 3 of the Telecommunication Technology Committee (TTC) Standard). In this figure, each reference numeral 45 designates an administrative unit group AUG as a tributary signal; and 46 designates an STM-N frame. The reference numeral 47 designates a information payload; 48 designates a section overhead SOH; and 49 designates an AU pointer. The recommendation specifies that the data in a plurality of administrative unit groups AUGs should undergo interleaving.

Next, the operation of the conventional system will be described.

When a plurality of tributary signals are input to the plurality of transmission side tributary circuits 39, 39 while the frame generating circuit 41 and frame identification circuit 42 are transmitting and receiving multiplex signal frames at every specified fixed interval, the multiplexer 40 multiplexes the plurality of tributary signals to generate the information payloads, and the frame generating circuit 41 adds the section overheads SOHs to the information payloads individually to create frames, and transmits them.

Receiving the frames, the frame identification circuit 42 supplies the information payloads to the demultiplexer 43, and at the same time decodes the section overhead (SOH) areas to generate phase information. The demultiplexer 43 demultiplexes the information payloads on the basis of the phase information to restore the plurality of tributary signals, and supplies the tributary signals to the receiving side tributary circuits 44, . . . , 44 designated by the phase information. The receiving side tributary circuits 44, . . . , 44 send the tributary signals to the downstream signal paths.

In this way, the conventional Synchronous Digital Hierarchy system can transmits tributary signals from the upstream signal paths to the corresponding downstream signal paths without fail.

With such a configuration, the conventional Synchronous Digital Hierarchy system must generate the information payloads by multiplexing the plurality of tributary signals, and then generate the section overheads (SOHs) containing the AU pointers to be added to the information payloads. In addition, since the multiplex signals thus generated are subjected to the interleaving before transmitted to the main signal path, the system must carry out the processing from generating the section overheads (SOHs) to adding them to the information payloads at a very high speed.

As a result, the Network Node Interface, which serves as a high end of an ATM network such as an international node interface using the optical cable 3, and which must transmit high-rate, large-volume information, presents a problem in that it is very difficult for the system to implement the multiplexer 40 or demultiplexer 43 because of the high bit-rate tributary signals themselves and of multiplexing multiple high bit-rate tributary signals, and in that even if they can be implemented, a great deal of power is consumed. In other words, making full use of the transmission rate of the optical cable 3 is limited by the operation rate of the multiplexer 40 or demultiplexer 43, which presents a problem in that the transmission cannot be implemented at the rate the optical cable 3 originally provides.

SUMMARY OF THE INVENTION

The present invention is implemented to solve the foregoing problems. It is therefore an object of the present invention to provide a multiplexing system and multiplexing method of tributary signals that can transmit a plurality of tributary signals fed from a plurality of upstream signal paths to their corresponding downstream signal paths without consuming a great deal of power or without impairing the transmission rate of the main signal path, and that can be preferably applied to the Network Node Interface serving as a high end of an ATM network such as an international node interface using an optical cable.

According to a first aspect of the present invention, there is provided a multiplex system of tributary signals including a transmitter for multiplexing a plurality of tributary signals supplied from a plurality of upstream signal paths onto a multiplex signal to be transmitted at every fixed interval, a receiver for demultiplexing the multiplex signal received onto a plurality of tributary signals to be supplied to a plurality of downstream signal paths, and a main signal path for transmitting the multiplex signal from the transmitter to the receiver, the transmitter comprising: a plurality of transmission side tributary circuits installed as many as the number of the upstream signal paths for assigning to individual tributary signals frame information and different identification codes, the frame information indicating a unit of the tributary signals in the multiplex signal, and the different identification codes being associated with the upstream signal paths, respectively; and a multiplexer for multiplexing outputs of the plurality of transmission side tributary circuits onto the multiplex signal to be supplied to the main signal path at every fixed interval, and the receiver comprising: a demultiplexer for demultiplexing the multiplex signal onto a same number of tributary signals as the tributary signals multiplexed; a plurality of receiving side tributary circuits installed as many as the number of tributary signals multiplexed onto multiplex signal for supplying the downstream transmission paths with the tributary signals output from the demultiplexer, at least one of the plurality of receiving side tributary circuits detecting its frame information and making a decision of its identification code in response to the frame information detected; and a distribution circuit installed between the demultiplexer and the receiving side tributary circuits for carry out switching of output destinations of the tributary signals supplied from the demultiplexer, the switching being implemented for the each unit of the tributary signals in the multiplex signal in response to a decision result of the at least one of the plurality of receiving side tributary circuits.

Here, the multiplexer may output the plurality of tributary signals supplied from the plurality of transmission side tributary circuits in a predetermined order, and the distribution circuit may carry out shifting and switching of the output destinations of the tributary signals to the receiving side tributary circuits with maintaining its demultiplexing order.

The at least one of the plurality of receiving side tributary circuits for deciding the identification code may comprise a code extraction circuit for extracting the identification code from at least one of the tributary signals, and a code identity detection circuit for comparing the identification code extracted by the code extraction circuit with a common identification code to output a match/mismatch decision result, wherein the distribution circuit may carry out switching of the output destinations of the tributary signals in response to the match/mismatch decision result.

The at least one of the plurality of receiving side tributary circuits for deciding the identification code may comprise a code extraction circuit for extracting the identification code from at least one of the tributary signals, wherein the distribution circuit may compare the identification code extracted with the identification code of the at least one of the plurality of receiving side tributary circuits, and carry out switching of the output destinations of the tributary signals in response to a difference between the two identification codes compared.

The at least one of the plurality of receiving side tributary circuits for deciding the identification code may comprise a code extraction circuit for extracting the identification code from at least one of the tributary signals, and a code phase difference decision circuit for comparing the identification code extracted by the code extraction circuit with a predetermined identification code assigned to the at least one of the plurality of receiving side tributary circuits to output a difference as a decision result, wherein the distribution circuit may carry out switching of the output destinations of the tributary signals in response to the difference.

The code phase difference decision circuit may comprise a plurality of code identity detection circuits for comparing the extracted identification code with all identification codes associated with the downstream signal paths, and a collection circuit for acquiring phase differences of the tributary signals in a multiplexed order in response to outputs of the plurality of code identity detection circuits and the multiplexed order of the tributary signals.

The code extraction circuit may output an extraction invalid signal when it cannot identify the frame information in the tributary signal supplied from the distribution circuit, wherein the distribution circuit may carry out switching disregarding a decision result of the identification code by the receiving side tributary circuit that outputs the extraction invalid signal.

The plurality of transmission side tributary circuits may each comprise a circuit for adding besides the identification code and frame information one of an error detecting code and an error correcting code of the identification code, wherein the code extraction circuit may further comprise an error detecting circuit for outputting an invalid signal when it detects an error in the identification code using one of the error detecting code and error correcting code, and wherein the distribution circuit may carry out switching disregarding a decision result of the identification code by the receiving side tributary circuit that outputs the invalid signal.

The code extraction circuit may output instead of the extracted identification code a masking code, which is not assigned as any of the predetermined identification codes, as the invalid signal when the extracted identification code includes an error.

The code extraction circuit may further comprise an error correcting circuit for correcting the extracted identification code in response to the error correcting code to output the extracted identification code passing through the error correction as the extracted identification code.

The code extraction circuit may output an extraction invalid signal as the invalid signal when it cannot correct the identification code in response to the error correcting code, wherein the distribution circuit may carry out switching disregarding a decision result of the extracted identification code by the receiving side tributary circuit that outputs the extraction invalid signal.

The distribution circuit, which switches the output destinations of the tributary signals in response to a plurality of decision results by the receiving side tributary circuits, may comprise a phase difference detection circuit for generating a plurality of shift amounts from the decision results; a phase difference decision circuit for selecting a most likely shift amount among the plurality of shift amounts; and a switching circuit for carrying out shifting and switching by the most likely shift amount selected.

The distribution circuit may halt the switching when the most likely shift amount is not unique.

The distribution circuit may halt its switching unless the plurality of shift amounts that agree with each other hold a majority.

The distribution circuit may halt its switching unless all the plurality of shift amounts agree with each other.

The distribution circuit may select the shift amount excluding a shift amount associated with an extraction invalid signal.

The distribution circuit may halt its switching when extraction invalid signals hold a majority.

The distribution circuit may halt its switching when at least one extraction invalid signal is present.

According to a second aspect of the present invention, there is provided a multiplex transmission method of tributary signals comprising the steps of: adding at a transmitting side frame information and different identification codes to tributary signals supplied from a plurality of upstream signal paths, the frame information indicating a unit of the tributary signals to be transmitted, and the identification codes being different for the upstream signal paths; multiplexing at the transmitting side the tributary signals passing through the step of adding onto a multiplex signal to be transmitted; demultiplexing at a receiving side the multiplex signal onto a plurality of tributary signals by using the frame information; and deciding in response to the identification codes downstream signal paths to which the tributary signals are supplied.

BRIEF DESCRIPTION OF THE DRAWINGS

FIG. 11 is a timing chart illustrating a distribution operation by the multiplex system of tributary signals of the embodiment 2 in accordance with the present invention;

FIG. 12 is a timing chart illustrating another distribution operation by the multiplex system of tributary signals of the embodiment 2 in accordance with the present invention;

FIG. 13 is a timing chart illustrating still another distribution operation by the multiplex system of tributary signals of the embodiment 2 in accordance with the present invention;

FIG. 14 is a block diagram showing a configuration of a code identification circuit of an embodiment 3 in accordance with the present invention;

FIG. 15 is a block diagram showing a configuration of a code identification circuit of an embodiment 4 in accordance with the present invention;

DETAILED DESCRIPTION OF THE PREFERRED EMBODIMENTS

The invention will now be described with reference to the accompanying drawings.

Embodiment 1

Figure 1:
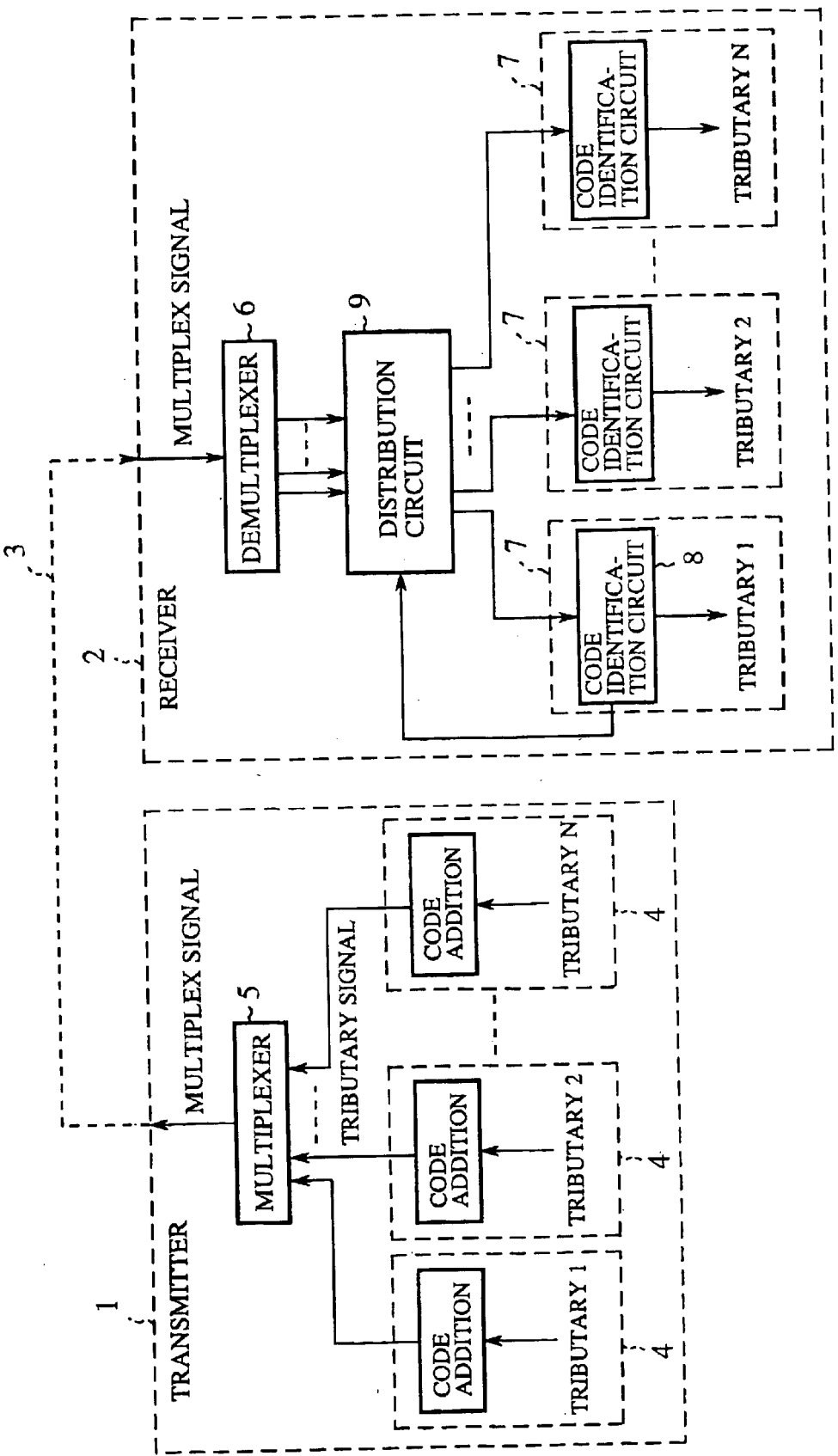
FIG. 1 is a block diagram showing a configuration of a multiplex system of tributary signals in an embodiment 1 in accordance with the present invention.

FIG. 1 is a block diagram showing a configuration of a multiplex system of tributary signals of an embodiment 1 in accordance with the present invention. In this figure, the reference numeral 1 designates a transmitter connected to a plurality of upstream transmission paths (not shown) for multiplexing a plurality of tributary signals fed from the upstream transmission paths and for outputting them as a multiplex signal; 2 designates a receiver connected to downstream transmission paths (not shown) whose number is equal to the number of the upstream transmission paths, for restoring from the multiplex signal the plurality of tributary signals and for supplying them to the corresponding downstream signal paths; and 3 designates an optical cable (main signal path) for interconnecting the transmitter 1 and the receiver 2.

In the transmitter 1, reference numerals 4 each designate a transmission side tributary circuit installed in one-to-one correspondence with the upstream transmission paths for superimposing identification code and frame information onto the tributary signals fed from the upstream signal paths; and 5 designates a multiplexer for receiving and multiplexing the outputs of all the transmission side tributary circuits 4, . . . , 4 onto the multiplex signal, and for supplying the multiplex signal to the optical cable 3 at every fixed interval.

The identification codes have different values for the respective upstream signal paths, whereas the frame information consists of only one data pattern common to all the tributary signals. In assigning these items of information to the specified vacant areas of the tributary signals, it is preferable that the relative phase (relative superimposing position) of the identification codes with respect to the frame information be fixed so that the relative phase is placed at a position common to all the tributary signals regardless of the values of the identification codes. In addition, the identification codes, which are described as having one-to-one correspondence with the individual upstream signal paths, have also one-to-one correspondence with the downstream signal paths because the downstream signal paths are assumed to have one-to-one correspondence with the upstream signal paths.

In the receiver 2, the reference numeral 6 designates a demultiplexer for detecting the frame information in the multiplex signal, and for demultiplexing the multiplex signal for every frame information to generate the same number of tributary signals as the tributary signals multiplexed by the transmitter 1; reference numerals 7 each designate a receiving side tributary circuit installed in one-to-one correspondence with the downstream signal paths for supplying the tributary signals to the corresponding downstream signal paths; 8 designates a code identification circuit installed in each receiving side tributary circuit 7 for comparing the identification code in the tributary signal distributed to the receiving side tributary circuit 7 with the identification code preassigned to the downstream signal path of the receiving side tributary circuit 7, and for outputting an identity signal when they agree; and 9 designates a distribution circuit for shifting and switching connections between the outputs of the demultiplexer 6 and the receiving side tributary circuits 7, . . . , 7 in response to a predetermined value when the identity signal is not supplied.

In the present embodiment 1, the multiplex signal is generated by multiplexing the tributary signals in accordance with the values (ascending or descending order) of the identification codes, and the distribution of the multiplex signal to the receiving side tributary circuits 7, . . . , 7 is determined by the demultiplexer 6 and distribution circuit 9 in accordance with the order of the identification codes. Therefore, once the distribution destination of a particular tributary signal is determined to a corresponding receiving side tributary circuit 7 with the matched identification code, the distribution destinations of the other tributary signals are also determined to the corresponding receiving side tributary circuits 7, . . . , 7.

Figure 2:
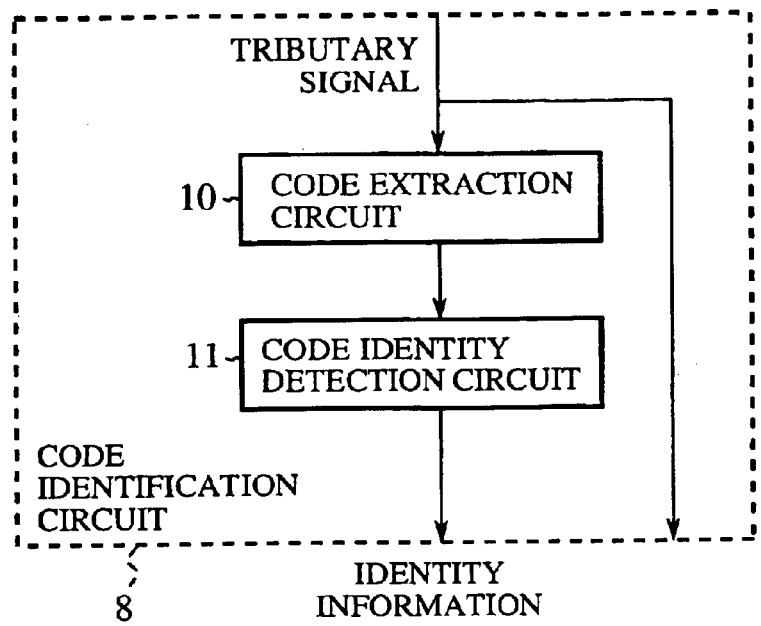
FIG. 2 is a detailed block diagram showing an internal configuration of a code identification circuit in the embodiment 1 in accordance with the present invention.

FIG. 2 is a detailed block diagram showing an internal configuration of the code identification circuit 8 of the embodiment 1 in accordance with the present invention. In this figure, the reference numeral 10 designates a code extraction circuit for extracting the identification code from the tributary signal it receives; and 11 designates a code identity detection circuit for deciding as to whether the identification code it receives agrees with the identification code corresponding to the receiving side tributary circuit 7 including this code identification circuit 8, and for outputting the decision result as the identity signal.

Figure 3:
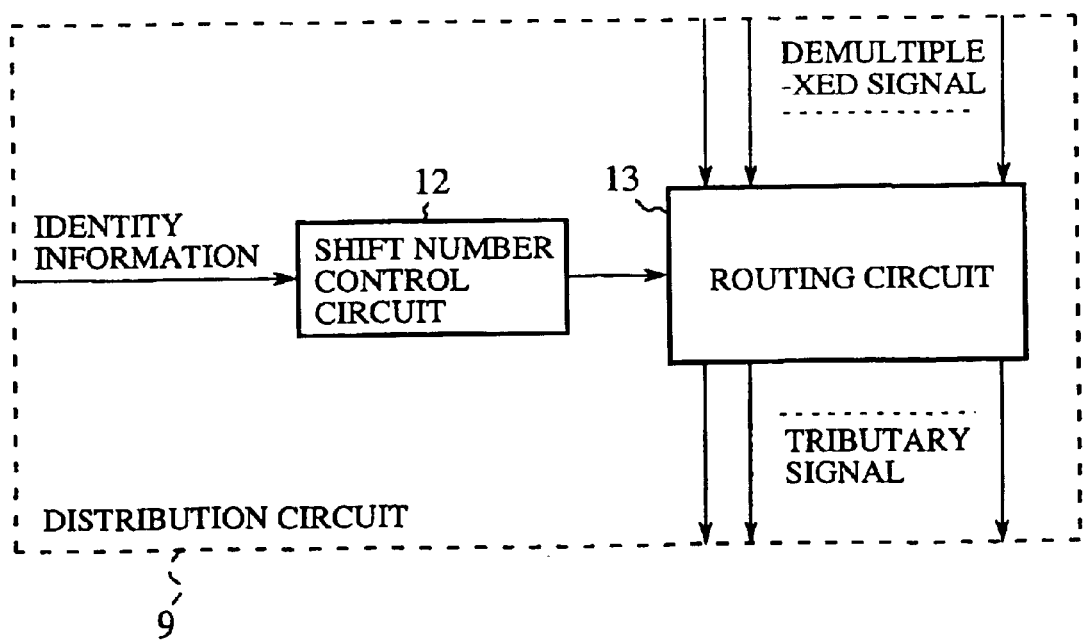
FIG. 3 is a detailed block diagram showing an internal configuration of a distribution circuit in the embodiment 1 in accordance with the present invention.

FIG. 3 is a detailed block diagram showing an internal configuration of the distribution circuit 9 of the embodiment 1 in accordance with the present invention. In this figure, the reference numeral 12 designates a shift number control circuit (switching circuit) for receiving the identity signal, and for outputting a shift amount signal of "0" when the identity signal indicates matching, whereas outputting the shift amount signal of a predetermined value when it does not indicate matching; and 13 designates a routing circuit (switching circuit) for receiving the shift amount signal from the shift number control circuit 12 and the tributary signals from the demultiplexer 6, and for shifting the tributary signals from the demultiplexer 6 in accordance with the number specified by the shift amount signal every time it is supplied, thereby supplying them to the receiving side tributary circuits 7, . . . , 7.

Next, the operation of the present embodiment 1 will be described.

The multiplexer 5 supplies the optical cable 3 with the multiplex signal at every fixed interval, and the demultiplexer 6 receives the multiplex signal in synchronism with the fixed interval.

Receiving the tributary signal in this state, each transmission side tributary circuit 4 superimposes the frame information and identification code onto the tributary signal. Thus, the multiplexer 5 is supplied with the plurality of tributary signals generated. Then, the multiplexer 5 arranges the plurality of tributary signals in the order of the identification codes, multiplexes them bit by bit, and outputs them as the multiplex signal.

Receiving the multiplex signal onto which the plurality of tributary signals are multiplexed, the demultiplexer 6 recognizes in response to a first frame information item detected a set of the tributary signals of the predetermined number multiplexed as a unit of the multiplex signal, divides the multiplex signal in terms of individual frame information items, and tentatively supplies the divided ones to the plurality of receiving side tributary circuits 7, . . . , 7 as the tributary signals. Subsequently, each receiving side tributary circuit 7 supplies the corresponding downstream signal path with the tributary signal.

At the same time, the code extraction circuit 10 in each code identification circuit 8 extracts the identification code superimposed on the tributary signal. The code identity detection circuit 11 makes a decision as to whether the identification code extracted agrees with the identification code associated with the receiving side tributary circuit 7 including the code identification circuit 8, and outputs the identity signal in response to the decision result. If the decision indicates a mismatch, the shift number control circuit 12 of the distribution circuit 9 outputs the shift amount signal of the predetermined number so that the routing circuit 13 shifts the set of tributary signals fed from the demultiplexer 6 by the number of the shift amount signal every time it is supplied, and supplies the shifted tributary signals to the receiving side tributary circuits 7, . . . , 7.

In contrast, if the extracted identification code agrees with the identification code corresponding to the receiving side tributary circuit 7 including the code identification circuit 8, the identity signal and the shift amount signal of "0" are output, which terminates the shift processing of the tributary signals by the routing circuit 13. Thus, the demultiplexer 6 supplies the tributary signals to the correct receiving side tributary circuits 7 with matched identification codes.

Figure 4:
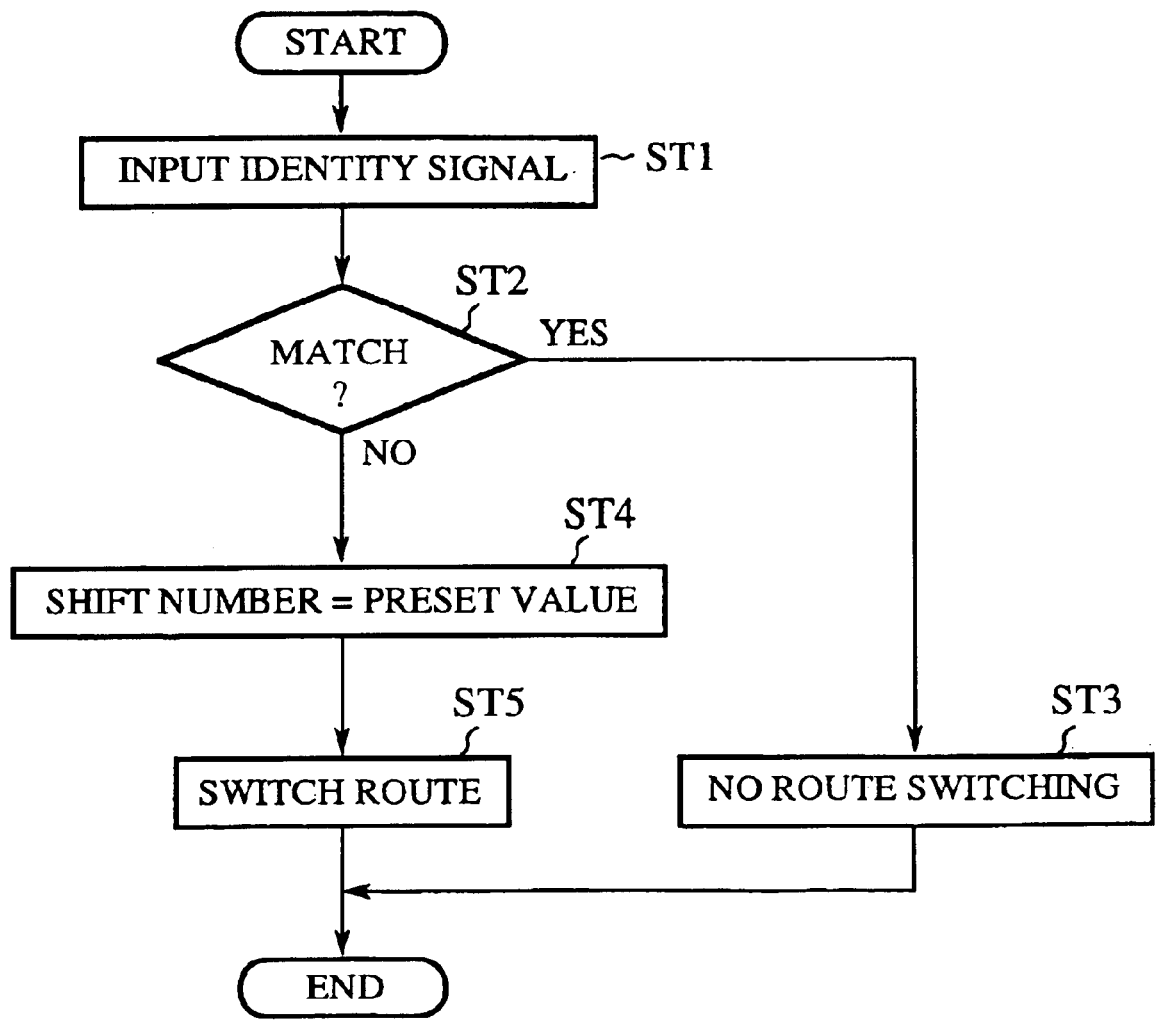
FIG. 4 is a flowchart illustrating the operation executed by the distribution circuit in the embodiment 1 in accordance with the present invention.

FIG. 4 is a flowchart illustrating the operation executed by the distribution circuit 9 of the embodiment a in accordance with the present invention. In this figure, the reference symbol ST1 designates an information input step of receiving the identity signal from the code identification circuit 8; ST2 designates a decision step of making the identity decision on the basis of the identity signal; ST3 designates a no-switching processing step carried out when the decision step ST2 makes an identity decision, in which case the shift amount signal of "0" is output; ST4 designates a shift amount setting step of outputting the shift amount signal of the predetermined value when the decision step ST2 makes a mismatch decision; and ST5 designates a switching processing step for the routing circuit 13 to carry out the shift switching processing on the basis of the shift amount signal.

Figure 5:
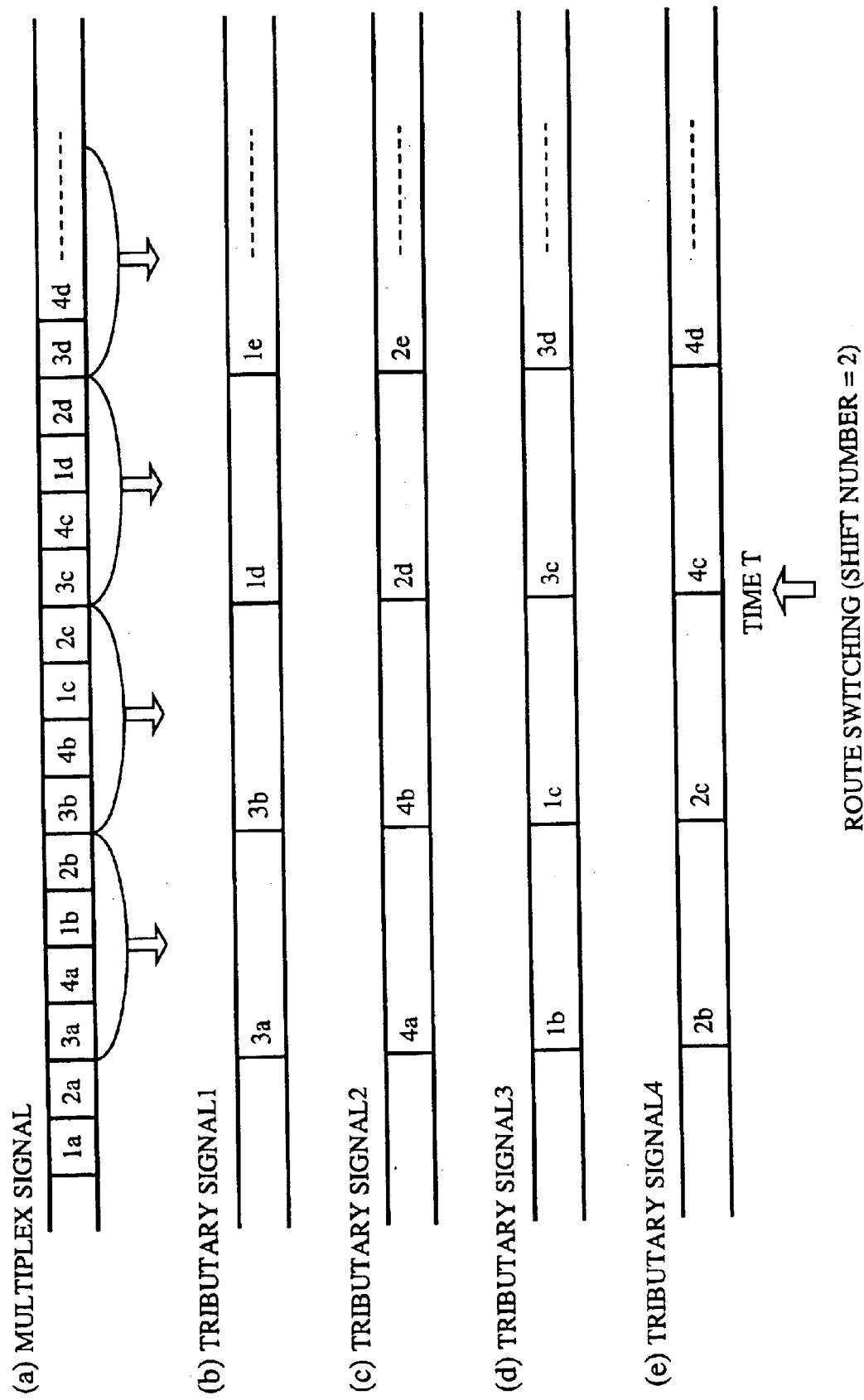
FIG. 5 is a timing chart illustrating a distribution operation by the multiplex system of tributary signals of the embodiment 1 in accordance with the present invention.

FIG. 5 is a timing chart illustrating a distribution operation of the multiplex system of tributary signals of the present embodiment 1 in accordance with the present invention. This figure illustrates an example in which the transmitter 1 multiplexes four tributary signals to be transmitted, and the receiver 2 distributes them to four downstream signal paths. In this figure, FIG. 5(a) illustrates the multiplex signal output from the transmitter 1; FIG. 5(b) illustrates an output signal to a first downstream signal path; FIG. 5(c) illustrates an output signal to a second downstream signal path; FIG. 5(d) illustrates an output signal to a third downstream signal path; and FIG. 5(e) illustrates an output signal to a fourth downstream signal path. In addition, the reference numerals 1a, 1b, 1c, 1d and 1e each designate the first tributary signal supplied from the first upstream signal path to the transmitter 1; 2a, 2b, 2c, 2d and 2e each designate the second tributary signal supplied from the second upstream signal path to the transmitter 1; 3a, 3b, 3c, 3d and 3e each designate the third tributary signal supplied from the third upstream signal path to the transmitter 1; and 4a, 4b, 4c, 4d and 4e each designate the fourth tributary signal supplied from the fourth upstream signal path to the transmitter 1. The transmitter 1 multiplexes the initial four tributary signals 1a, 2a, 3a and 4a from the upstream signal paths onto the first multiplex signal, the second four tributary signals 1b, 2b, 3b and 4b onto the second multiplex signal, and so on.

In FIG. 5, the demultiplexer 6 of the receiver 2 recognizes in the first cycle of FIG. 5 the frame information of the third tributary signal 3a as the first frame information of the tributary signal, and hence identifies the third tributary signal 3a, fourth tributary signal 4a, first tributary signal 1b and second tributary signal 2b as a unit of the multiplex signal. Thus, the first downstream signal path is supplied with the third tributary signal 3a; the second downstream signal path with the fourth tributary signal 4a; the third downstream signal path with the first tributary signal 1b; and the fourth downstream signal path with the second tributary signal 2b.

In this distribution state, the code identification circuit 8 does not output identity signal, in response to which, the distribution circuit 9 switches the output destination by the specified shift amount ("2" in FIG. 5). As a result, in the third cycle of FIG. 5, the first downstream signal path is supplied with the first tributary signal 1d; the second downstream signal path with the second tributary signal 2d; the third downstream signal path with the third tributary signal 3c; and the fourth downstream signal path with the fourth tributary signal 4c. Thus, the code identification circuit 8 outputs the identity signal, entering a stable state.

As described above, according to the present embodiment 1, the transmitter 1 is configured such that the transmission side tributary circuits 4 add their identification codes and frame information to the tributary signals, and then the multiplexer 5 multiplexes the outputs of the transmission side tributary circuits 4, . . . , 4 onto the multiplex signal to be supplied to the optical cable 3 at every fixed interval, and the receiver 2 is configured such that the demultiplexer 6 detects the frame information added to the multiplex signal in advance, and demultiplexes the multiplex signal onto the same number of tributary signals as the multiplexed tributary signals by recognizing the multiplex signal on the basis of the frame information. Therefore, the multiplexer 5 of the transmitter 1 has an advantage over the conventional system of being able to send the multiplex signal to the optical cable 3 without generating the section overheads (SOHs) including the AU pointers, which are added to the information payloads generated by multiplexing the tributary signals. Likewise, the receiver 2 has an advantage over the conventional system of being able to generate from the multiplex signal the predetermined number of tributary signals without decoding the section overheads (SOHs) with the demultiplexer 6 (that is, without operating the demultiplexer 6 at a high speed in synchronism with the multiplex signal itself) to divide the information payloads to the tributary signals.

Therefore, the transmission of the plurality of tributary signals from the transmitter 1 to the receiver 2 can be achieved without operating the multiplexer 5 and demultiplexer 6, which are used in the step of transmitting and receiving a great volume of information, at a very high speed as in the conventional system. In other words, the transmission of tributary signals can be implemented by only adding the simple processings before the multiplexing and after the demultiplexing. This offers an advantage of being able to easily implement the multiplexer 5 and distribution circuit 9 even in the Network Node Interfaces serving as the high ends of an ATM network such as the international node interfaces using the optical cable 3 that must transmit large-volume information at a high rate, and in addition to prevent large amount of power from being consumed because of the reduction in the circuit scale for the high-speed operation. In other words, the transmission rate of the optical cable 3 is not limited by the operation speed of the multiplexer 5 or distribution circuit 9 as in the conventional system. This offers an advantage of being able to make full use of the optical cable 3 at such a high transmission rate that the conventional system cannot implement by any means.

Furthermore, the receiver 2, which comprises the demultiplexer 6 and the receiving side tributary circuits 7, . . . , 7 for supplying the tributary signals to the downstream transmission paths, not only has at least one receiving side tributary circuit 7 decide the identification code, but also includes the distribution circuit 9 connected between the demultiplexer 6 and the receiving side tributary circuits 7, . . . , 7, for switching, in response to the decision result of one or more receiving side tributary circuits 7, . . . , 7, the output destinations of the tributary signals from the demultiplexer 6 to the receiving side tributary circuits 7, . . . , 7 with handling the same number of the tributary signals simultaneously multiplexed onto the multiplex signal as a unit. This offers an advantage of being able to transmit the tributary signals fed from the upstream signal paths correctly to the corresponding downstream signal paths because even if the demultiplexer 6 does not carry out the demultiplexing in synchronism with the multiplex signal, that is, even if a plurality frame information items detected overlap on consecutive two units of the multiplex signal, and the correspondence between the receiving side tributary circuits 7, . . . , 7 and the tributary signals generated differs from the predetermined relation at the start of the operation, the correspondence can be corrected on the basis of the identification codes.

Thus, the present embodiment 1 can correctly connect the upstream signal paths with the corresponding downstream signal paths. Accordingly, it is preferably applicable to the Network Node Interfaces serving as the high ends of an ATM network such as the international node interfaces utilizing the optical cable 3, which can meet the requirement for transmitting high-rate, large-volume information.

According to the present embodiment 1, the multiplexer 5 transmits the plurality of tributary signals fed from the transmission side tributary circuits 4, . . . , 4 in a predetermined order, and the distribution circuit 9 shifts and switches the output destinations of the tributary signals to the plurality of receiving side tributary circuits 7, . . . , 7 with maintaining the order of the demultiplexing. This offers an advantage of being able to connect all the upstream signal paths correctly with the downstream signal paths by the simple shift operation.

Embodiment 2

Figure 6:
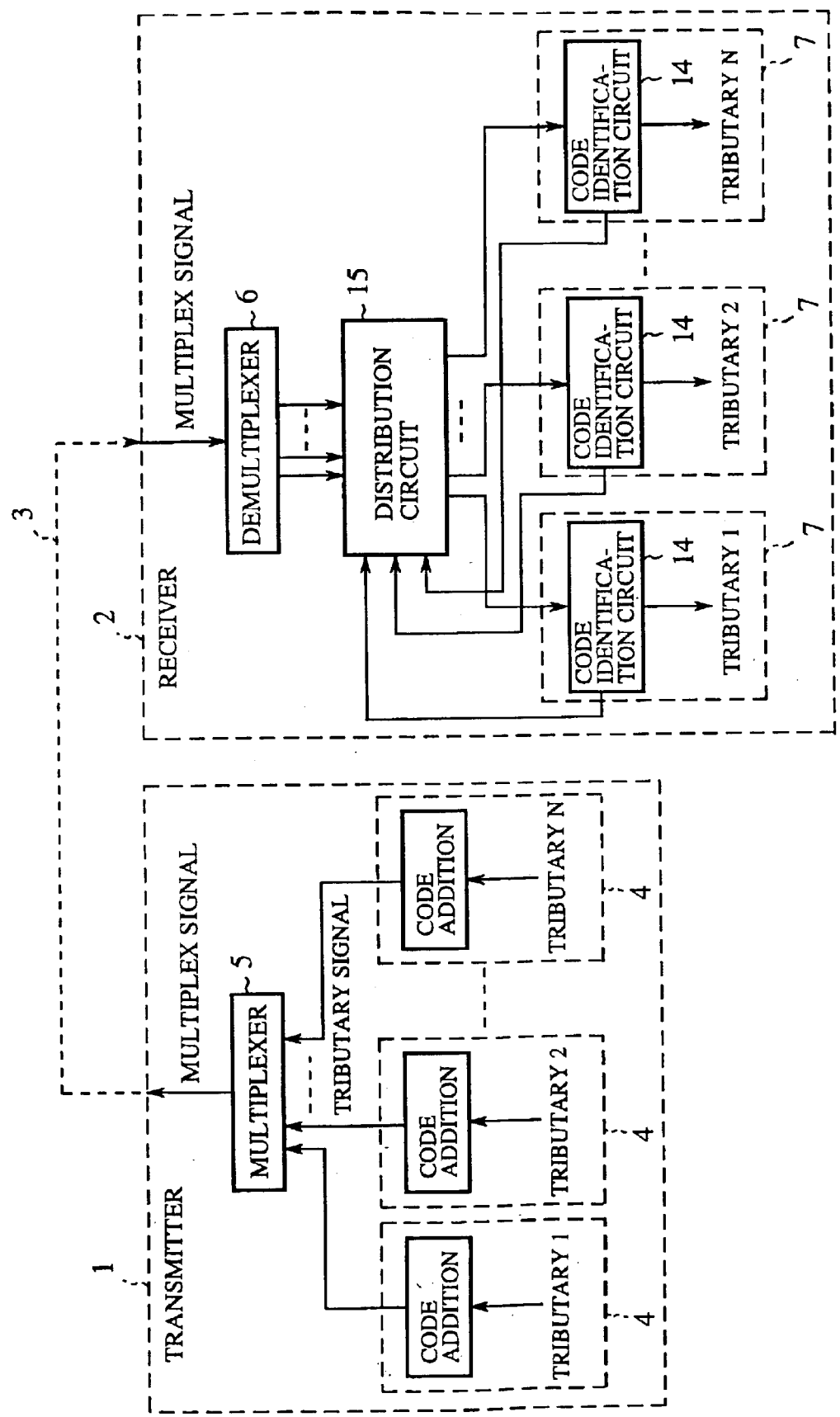
FIG. 6 is a block diagram showing a configuration of a multiplex system of tributary signals of an embodiment 2 in accordance with the present invention.

FIG. 6 is a block diagram showing a configuration of a multiplex system of tributary signals of an embodiment 2 in accordance with the present invention. In this figure, each reference numeral 14 designates a code identification circuit included in each one of the receiving side tributary circuits 7, . . . , 7 for comparing the identification code in the tributary signal distributed to each receiving side tributary circuit 7 with a common preset identification code, and for outputting the identity signal when they agree with each other; the reference numeral 15 designates a distribution circuit for receiving the plurality of identity signals, and for shifting and switching the connections between the plurality of outputs of the demultiplexer 6 and the receiving side tributary circuits 7, . . . , 7 in response to the identity signals.

Figure 7:
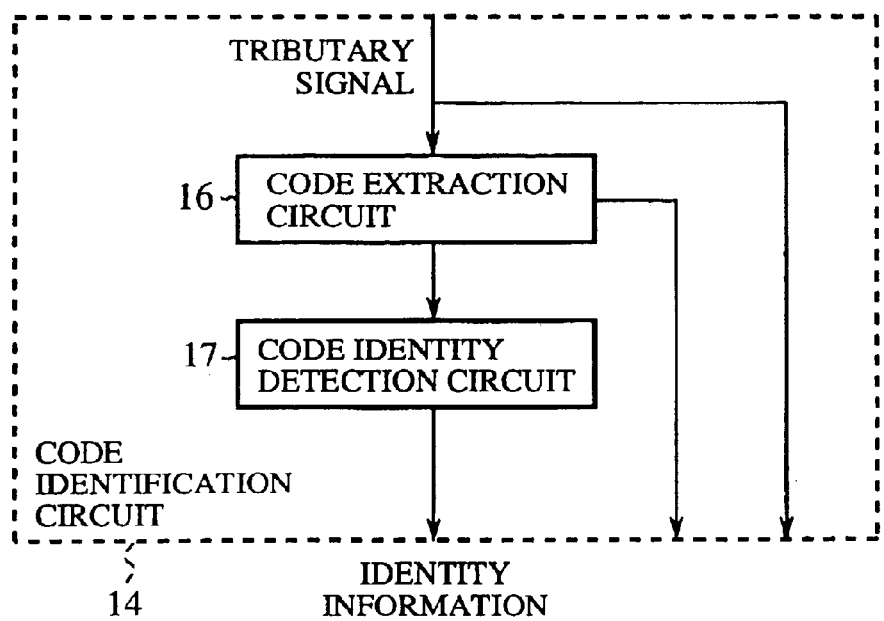
FIG. 7 is a detailed block diagram showing an internal configuration of a code identification circuit of the embodiment 2 in accordance with the present invention.

FIG. 7 is a detailed block diagram showing an internal configuration of a code identification circuit 14 of the embodiment 2 in accordance with the present invention. In this figure, the reference numeral 16 designates a code extraction circuit for extracting the identification code from the tributary signal it receives; and 17 designates a code identity detection circuit for deciding as to whether the extracted identification code agrees with the common preset identification code, and for outputting the decision result as the identity signal.

Figure 8:
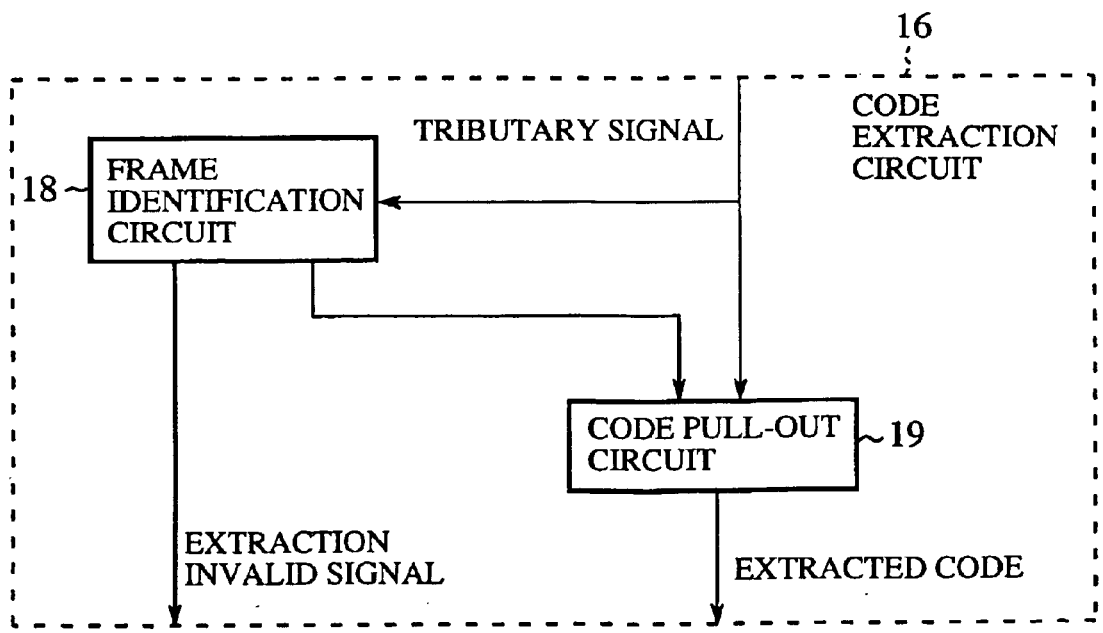
FIG. 8 is a detailed block diagram showing an internal configuration of a code extraction circuit of the embodiment 2 in accordance with the present invention.

FIG. 8 is a detailed block diagram showing an internal configuration of the code extraction circuit 16 of the embodiment 2 in accordance with the present invention. In this figure, the reference numeral 18 designates a frame identification circuit for detecting the frame information in the tributary signal, and for outputting an extraction invalid signal if the frame information is not detected; and 19 designates a code pull-out circuit for extracting, in response to the signal supplied from the frame identification circuit 18, the identification code consisting of the predetermined bits from the frame identified.

Figure 9:
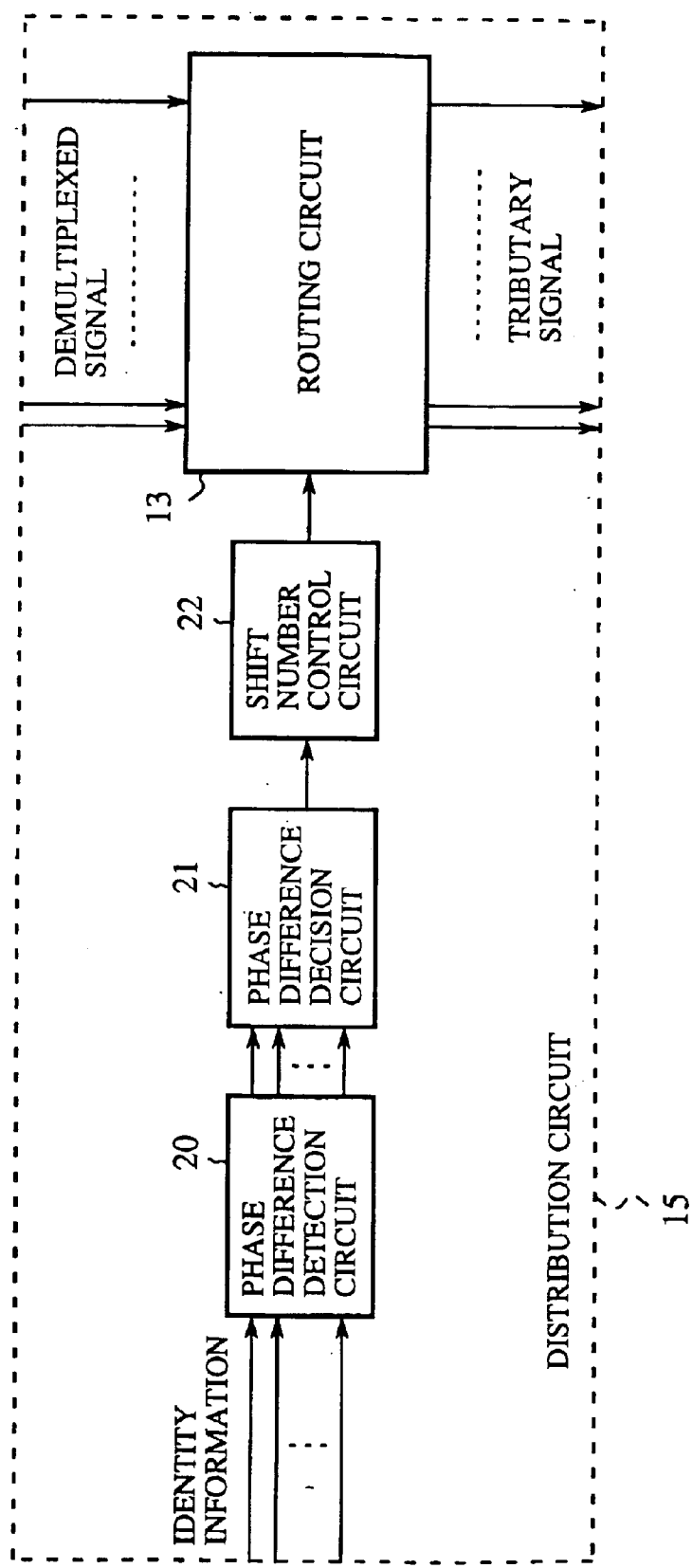
FIG. 9 is a detailed block diagram showing an internal configuration of a distribution circuit in the embodiment 2 in accordance with the present invention.

FIG. 9 is a detailed block diagram showing an internal configuration of the distribution circuit 15 in the embodiment 2 in accordance with the present invention. In this figure, the reference numeral 20 designates a phase difference detection circuit for detecting phase differences on the basis of the plurality of identity signals supplied; 21 designates a phase difference decision circuit for deciding the most likely phase difference from the phase difference information supplied from the phase detection circuit 20; and 22 designates a shift number control circuit (switching circuit) for generating the shift amount signal indicating an amount for canceling the phase difference in response to the output of the phase difference decision circuit 21. If the calculation result of the shift amount takes a negative value, it is enough to add the number of the tributary signals multiplexed onto the multiplex signal to the result. The remaining components are the same as those of the foregoing embodiment 1 designated by the same reference numerals, and the description thereof is omitted here.

Next, the operation of the present embodiment 2 will be described.

When the demultiplexer 6 supplies each of the receiving side tributary circuits 7, . . . , 7 with a tributary signal through the distribution circuit 15, the frame identification circuit 18 of the code extraction circuit 16 identifies the frame information of the tributary signal, and outputs the extraction invalid signal if it cannot identify the frame information at every fixed interval. In response to the output of the frame identification circuit 16, the code pull-out circuit 19 of the code extraction circuit 16 extracts the identification code from the tributary signal. Subsequently, the code identity detection circuit 17 compares the extracted identification code with the common preset identification code, and outputs the identity signal when they agree.

Incidentally, the frame identification circuit 18 can identify the frame information superimposed over the tributary signal by carrying out pattern matching between the bit stream of the tributary signal and that of the frame information. In addition, the code pull-out circuit 19 can readily extract the identification code in response to the output of the frame identification circuit 18 as follows. First, a fixed distance (phase difference) is provided between the frame information and the identification code superimposed over the tributary signal by transmitter 1. Second, the code pull-out circuit 19 extracts the identification code at the timing delayed by the amount corresponding to the phase difference from the output of the signal frame identification circuit 18.

The phase difference detection circuit 20, receiving the plurality of identity signals, identification codes and extraction invalid signals from all the receiving side tributary circuits 7, . . . , 7, decides the phase difference on the basis of the identification code of the code identification circuit 14 that outputs the identity signal. Subsequently, the phase difference decision circuit 21 outputs as the phase difference the difference between the identification code associated with the identity signal and the identification code associated with the downstream signal path connected to the code identification circuit 14 that outputs the identity signal. The shift number control circuit 22 outputs the shift amount signal indicating the amount for canceling the phase difference, and the routing circuit 13 switches the connection destinations of the tributary signals in response to the shift amount signal.

Figure 10:
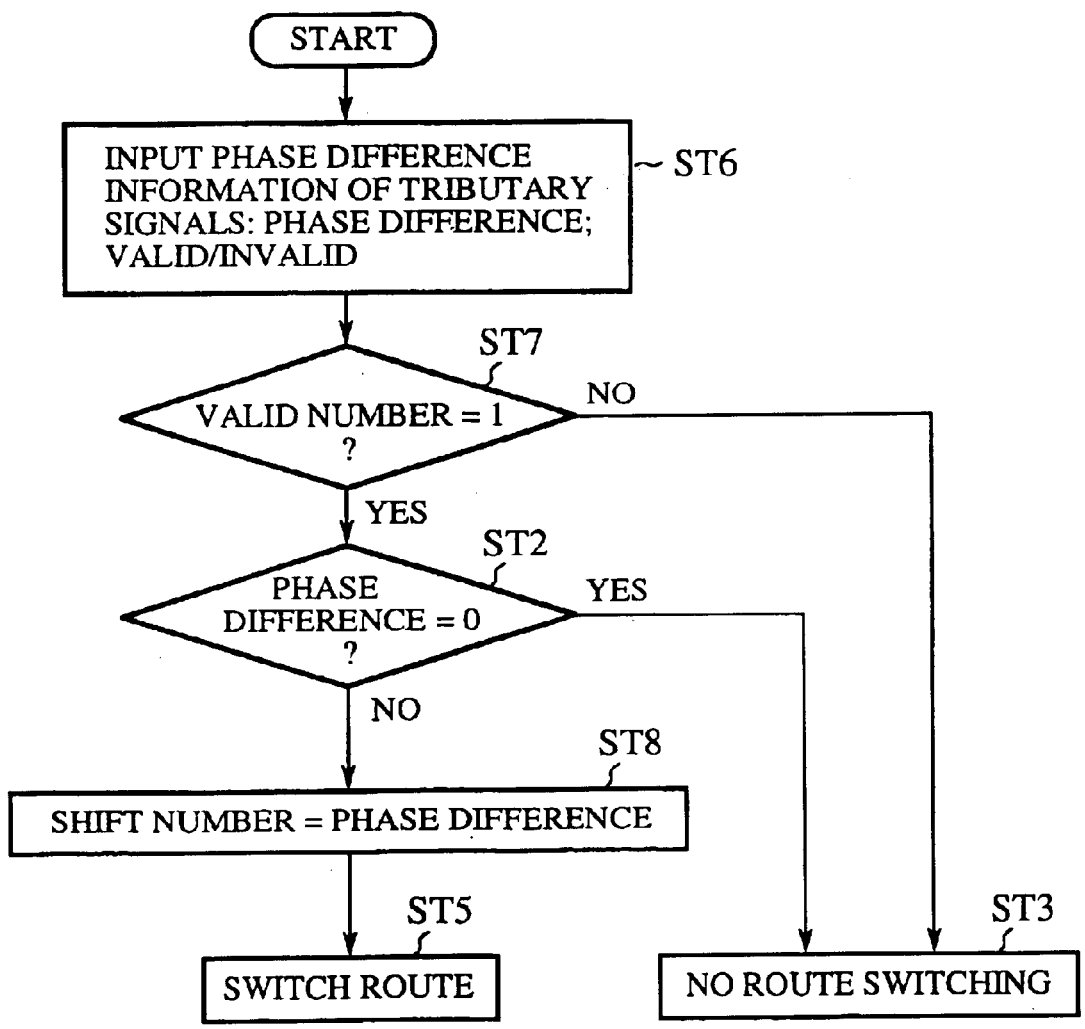
FIG. 10 is a flowchart illustrating the operation executed by the distribution circuit in the embodiment 2 in accordance with the present invention.

FIG. 10 is a flowchart illustrating the operation carried out by the distribution circuit 15 in the present embodiment 2 in accordance with the present invention. In this figure, the reference symbol ST6 designates an information input step of receiving the identity signals, identification codes and extraction invalid signals from the code identification circuits 14; ST7 designates a valid number decision step of making a decision as to whether the number of the valid identity signals is one or not; and ST8 designates a shift amount setting step of calculating the phase difference between the identification code associated with only one valid identity signal and the identification code associated with the downstream signal path connected to the code identification circuit 14 that outputs the only one valid identity signal, thereby outputting the shift amount signal indicating the phase difference. The remaining steps are the same as those of FIG. 4, and the description thereof is omitted here.

FIG. 11 is a timing chart illustrating an example of the distribution operation by the multiplex system of tributary signals of the embodiment 2 in accordance with the present invention. In the first cycle, the downstream signal paths receive the tributary signals from the paths deviating by two. The phase difference is calculated as "2" on the basis of the difference between the two identification codes, and the shift of "2" is carried out so that the phase is aligned in the third cycle. Since the remaining operation is the same as that of the foregoing embodiment 1, the description thereof is omitted here.

FIG. 12 is a timing chart illustrating another example of the distribution operation by the multiplex system of tributary signals of the embodiment 2 in accordance with the present invention. FIG. 12(*a*) illustrates the identification code output from the first receiving side tributary circuit 7; FIG. 12(*b*) illustrates the identification code output from the second receiving side tributary circuit 7; FIG. 12(*c*) illustrates the identification code output from the third receiving side tributary circuit 7; and FIG. 12(*d*) illustrates the identification code output from the fourth receiving side tributary circuit 7. In the first cycle, the identification code output from the first receiving side tributary circuit 7 and the identification code output from the second receiving side tributary circuit 7 are invalid. However, since the remaining two identification codes are valid, the correct tributary signals can be output in the third cycle by shifting the phase by "2". Thus, even if part of data includes bit error, the correct switching can be achieved.

FIG. 13 is a timing chart illustrating still another example of the distribution operation by the multiplex system of tributary signals of the embodiment 2 in accordance with the present invention. In the first cycle, the identification code output from the first receiving side tributary circuit 7 and the identification code output from the second receiving side tributary circuit 7 are invalid. However, since the remaining two identification codes are valid, the correct tributary signals can be output in the third cycle by shifting the phase by "2". Thus, even if part of data that continuously includes bit error because of a fault of the transmission side tributary circuit 4 or the like, the correct switching can be achieved.

According to the present embodiment 2, each of the receiving side tributary circuits 7, . . . , 7 that decide the identification codes comprises the code extraction circuit 16 for extracting the identification code from the tributary signal, and the code identity detection circuit 17 for comparing the single common identification code with the identification code extracted by the code extraction circuit 16 and for outputting the decision result of match/mismatch; and the distribution circuit 15 for switching the output destinations of the tributary signals on the basis of the plurality of match/mismatch decision results. This offers an advantage of being able to implement fast switching because each switching can be carried out by a simple decision operation.

According to the present embodiment 2, if the code extraction circuit 16 cannot identify the frame information from the signal supplied from the distribution circuit 15 as the tributary signal, it outputs the extraction invalid signal so that the distribution circuit can carry out switching disregarding the decision result about the identification code of the receiving side tributary circuit 7 which outputs that extraction invalid signal. This makes it possible to prevent erroneous switching based on the incorrect identification code that can occur in such a state that the synchronization is not established between the tributary signals of the multiplex signal. In particular, this can prevent an erroneous operation such as switching all the tributary signals in a case where part of the tributary signals includes an error, offering an advantage of being able to improve the stability and reliability of the system.

According to the present embodiment 2, the distribution circuit 15, which switches the output destinations of the tributary signals on the basis of the decision results of the receiving side tributary circuits 7, . . . , 7, comprises the phase difference detection circuit 20 for generating a plurality of shift amounts on the basis of the decision results; the phase difference decision circuit 21 for extracting a best matching shift amount from the shift amounts; the shift number control circuit 22 for switching by the extracted shift amount; and the routing circuit 13. This makes it possible to calculate the shift amounts on the basis of the plurality of decision results, and to extract the most likely shift amount from the plurality of shift amounts to carry out switching. This offers an advantage of being able- to distribute the tributary signals to the correct receiving side tributary circuits 7, . . . , 7 by a single switching operation or so.

Embodiment 3

FIG. 14 is a block diagram showing a configuration of the code identification circuit 14 of an embodiment 3 in accordance with the present invention. In this figure, reference numerals 23*a*, . . . , 23*n* designate code identity detection circuits installed by the number of the output signal paths for detecting the match/mismatch between the different identification codes of the paths and the extracted identification code; the reference numeral 24 designates a collection circuit for collecting the plurality of identity detection results, and for outputting the number of the matched detecting result as the identity signal together with the extracted identification code. The phase difference detection circuit 20 of the distribution circuit 15, to which the outputs of the plurality of collection circuits 24, . . . , 24 are input, calculates the phase differences from the plurality of identity signals and the identification codes, and the phase difference decision circuit 21 selects the most likely phase differences from among the plurality of phase differences. Since the remaining configuration is the same as that of the foregoing embodiment 2, the description thereof is omitted here.

Next, the operation of the present embodiment 3 will be described.

When the demultiplexer 6 supplies each of the receiving side tributary circuits 7, . . . , 7 with the tributary signal, and the code extraction circuit 16 outputs the identification code, each of the code identity detection circuits 23*a*, . . . , 23*n* compares its identification code with the extracted identification code, and outputs the result. If there are any identity information in the results, the collection circuit 24 outputs the number of the matched detection result as the identity signal. The distribution circuit 15 decides the phase difference on the basis of the identity signals, and switches the connection destinations of the tributary signals in response to the most likely phase difference among the phase differences. If the compared results do not include any matched result, the extraction invalid signal is output. Since the remaining operation is the same as that of the foregoing embodiment 2, the description thereof is omitted here.

As described above, according to the present embodiment 3, the receiving side tributary circuits 7 for deciding the identification codes each comprise the code extraction circuit 16 for extracting the identification code from the tributary signal distributed, and the distribution circuit 15 compares one or more extracted identification codes with the identification codes of the receiving side tributary circuits 7 that output the one or more extracted identification codes, and switches the output destinations of the tributary signals in response to the difference between the identification codes. This offers an advantage of being able to achieve high-speed switching because the switching can be completed in a small number of switching steps.

According to the present embodiment 3, each code identification circuit 14 comprises the code identity detection circuits 23a, . . . , 23n for comparing all the identification codes with the extracted identification code; and the collection circuit 24 for outputting the offset of the extracted identification code in the multiplexing order in the multiplex signal on the basis of the multiplexing order and the outputs of the plurality of code identity detection circuits 23a, . . . , 23n. This offers an advantage of being able to ensure the code difference decision, and the high-speed switching.

Embodiment 4

Figure 16:
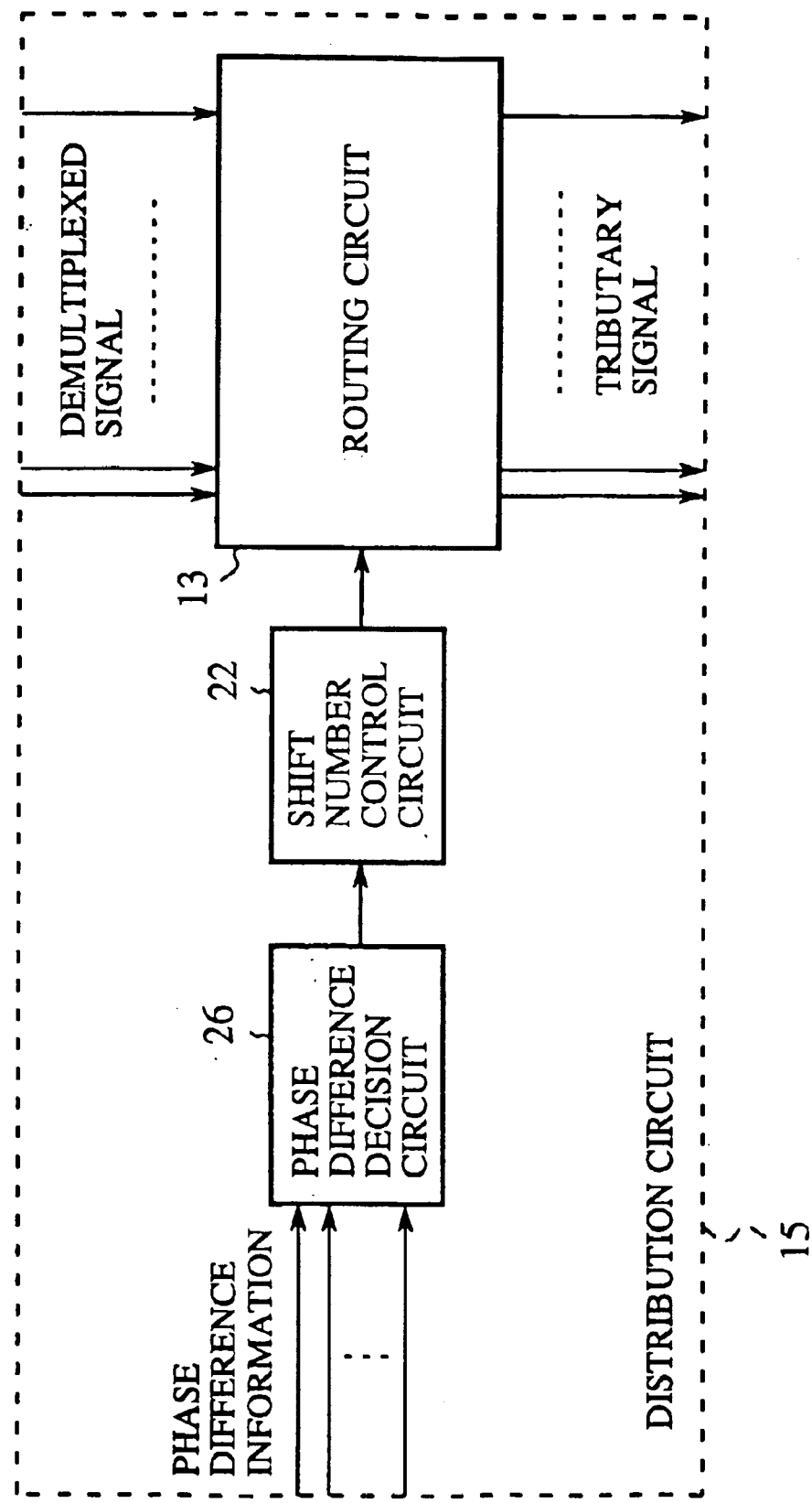
FIG. 16 is a block diagram showing a configuration of a distribution circuit of the embodiment 4 in accordance with the present invention.

FIG. 15 is a block diagram showing a configuration of a code identification circuit 14 of an embodiment 4 in accordance with the present invention, and FIG. 16 is a block diagram showing a configuration of a distribution circuit 15 of the embodiment 4. In these figures, the reference numeral 25 designates a phase difference detection circuit for receiving the identity detection results from the code identity detection circuits 23a, . . . , 23n, and for outputting as the phase difference signal the offset of the matched identification code from its own identification code in the multiplexed order; and 26 designates a phase difference decision circuit for receiving a plurality of phase difference signals, and for selecting the most likely phase difference among the phase difference signals. Since the remaining configuration is the same as that of the foregoing embodiment 3, the description thereof is omitted here.

Next, the operation of the present embodiment 4 will be described.

When the demultiplexer 6 supplies the receiving side tributary circuits 7, . . . , 7 with the tributary signals, and the code identity detection circuits 23a, . . . , 23n output the compared results of the identification codes, each phase difference detection circuit 25 outputs as the phase difference signal the offset of the identification code with the matched compared result from its own identification code in the multiplexed order. The phase difference decision circuit 26 selects from the plurality of phase difference signals thus obtained the most likely phase difference, and outputs it. Since the remaining operation is the same as that of the foregoing embodiment 3, the description thereof is omitted here.

As described above, according to the present embodiment 4, each of the receiving side tributary circuits 7, . . . , 7 for deciding the identification codes comprises the code extraction circuit 16 for extracting the identification code from the tributary signal, and the code identity detection circuits 23a, . . . , 23n for comparing the identification code extracted by the code extraction circuit 16 with the plurality of identification codes, and for outputting the difference as the decision result; and the distribution circuit 15 switches the output destinations of the tributary signals in response to the code difference. This offers an advantage of being able to complete the switching in the three steps of extracting the identification codes, deciding the code difference and switching the output destinations, thereby speeding up the switching in a small number of steps.

Embodiment 5

Figure 17:
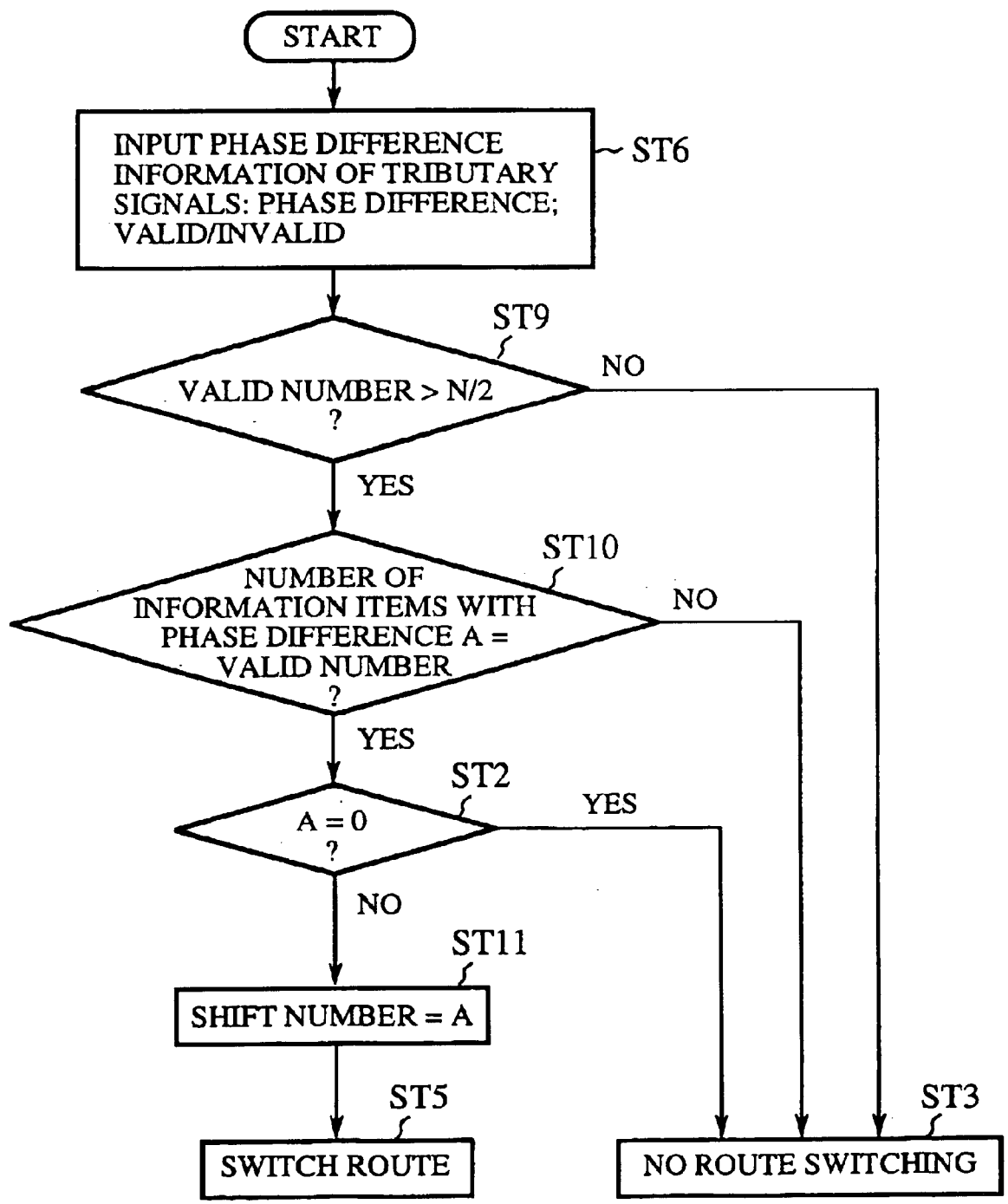
FIG. 17 is a flowchart illustrating the operation executed by the distribution circuit in an embodiment 5 in accordance with the present invention.

FIG. 17 is a flowchart illustrating the operation executed by the distribution circuit-15 in an embodiment 5 in accordance with the present invention. In this figure, the reference symbol ST9 designates a valid number decision step of deciding as to whether the number of the valid identification codes, that is, the number of the code extraction circuits 16 that do not output the extraction invalid signals is greater than half the total; ST10 designates a phase difference decision step of deciding as to whether all the valid signals indicate the same phase difference; and ST11 designates a shift amount setting step of outputting the shift amount signal indicating the same phase difference. Since the remaining configuration and operation are the same as those of the foregoing embodiment 3, the description thereof is omitted here.

As described above, according to the present embodiment 5, the distribution circuit 15 decides the shift amount by excluding the shift amounts associated with the extraction invalid signals. This offers an advantage of being able to switch the distribution destinations of the tributary signals on the basis of the most likely one or more identification codes even in such a case as the optical cable 3 is unstable and unreliable.

According to the present embodiment 5, the distribution circuit 15 does not carry out the switching when the extraction invalid signals comprises the majority.

This offers an advantage of being able to positively prevent the switching of the distribution destinations of the tributary signals from being executed erroneously in such a case as the optical cable 3 is unstable and unreliable.

Embodiment 6

Figure 18:
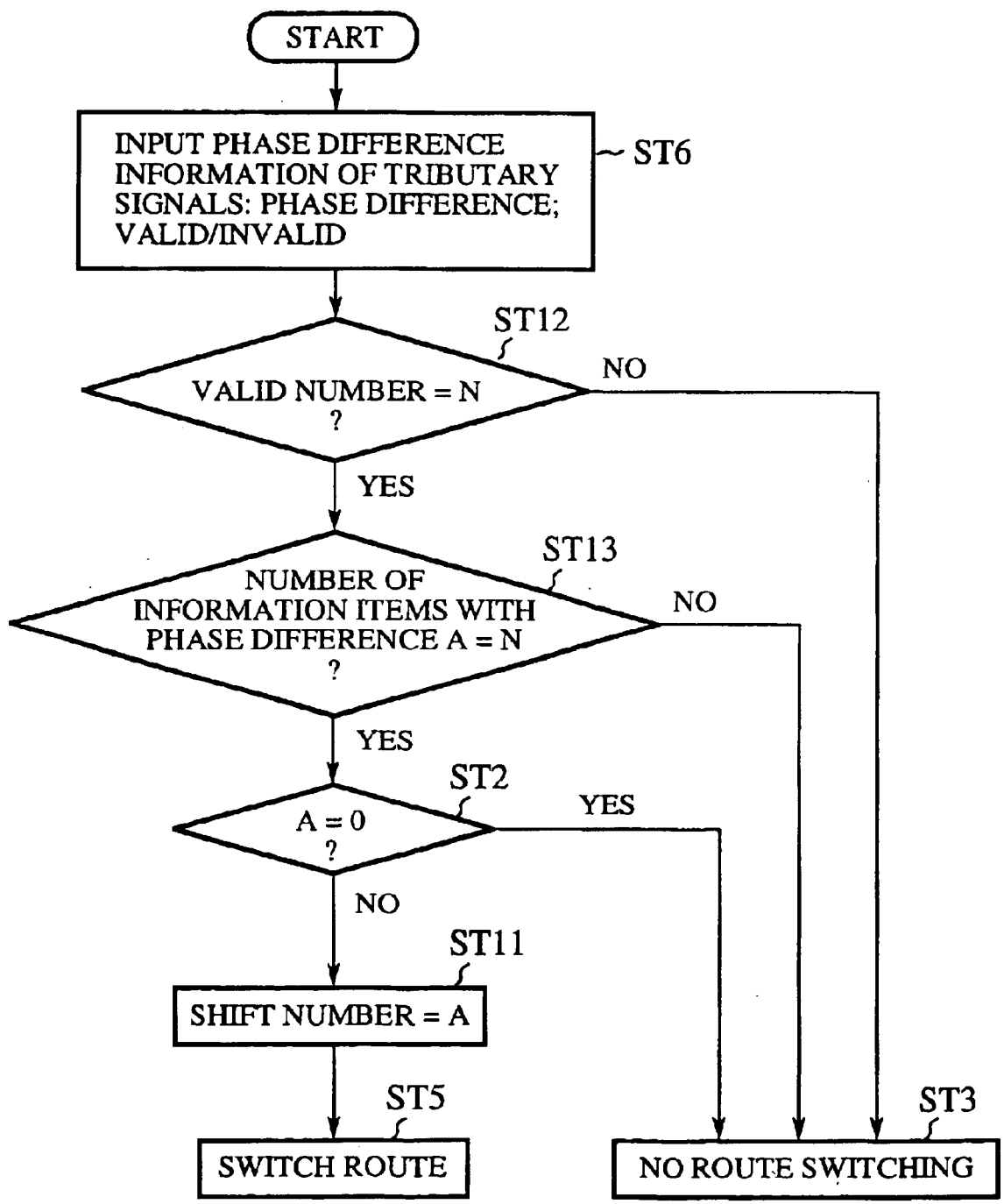
FIG. 18 is a flowchart illustrating the operation executed by the distribution circuit in an embodiment 6 in accordance with the present invention.

FIG. 18 is a flowchart illustrating the operation of the distribution circuit 15 in an embodiment 6 in accordance with the present invention 6. In this figure, the reference symbol ST12 designates a valid number decision step of deciding as to whether all the identification codes are valid or not (that is, whether any extraction invalid signal is present or not); and ST13 designates a phase difference decision step of deciding as to whether all the valid code identification circuits output the same phase difference. Since the remaining configuration and operation are the same as those of the foregoing embodiment 3, the description thereof is omitted here.

As described above, according to the present embodiment 6, the distribution circuit 15 does not carry out switching unless all the shift amounts agree. This offers an advantage of being able to prevent the distribution destinations of the tributary signals from being erroneously switched in such a case as the optical cable 3 is unstable and unreliable.

According to the present embodiment 6, the distribution circuit 15 does not carry out the switching as long as any extraction invalid signal is output. This offers an advantage of being able to positively prevent the distribution destinations of the tributary signals from being erroneously switched in such a case as the main signal path is unstable and unreliable.

Embodiment 7

Figure 19:
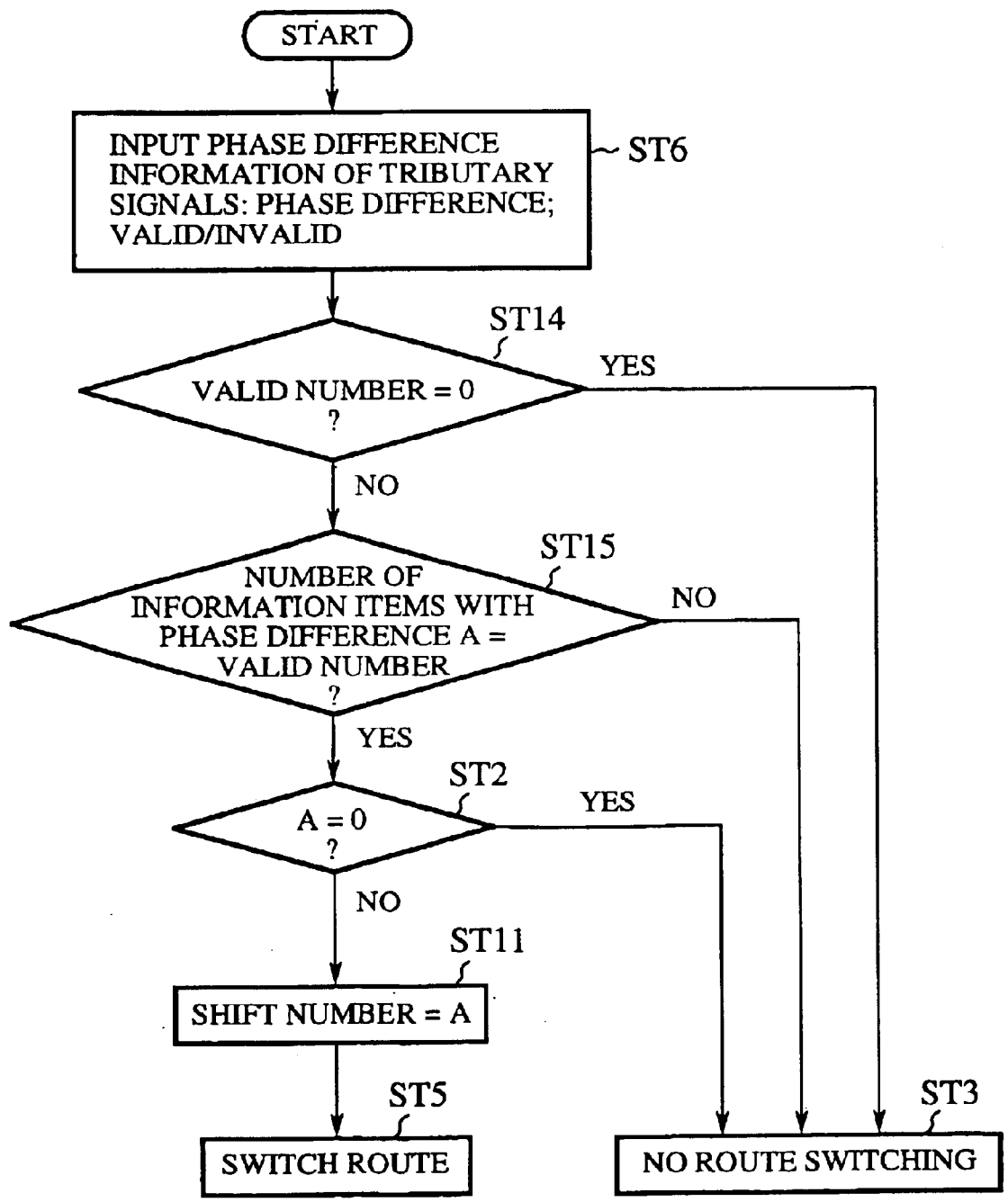
FIG. 19 is a flowchart illustrating the operation executed by the distribution circuit in an embodiment 7 in accordance with the present invention.

FIG. 19 is a flowchart illustrating the operation of the distribution circuit 15 in an embodiment 7 in accordance with the present invention. In this figure, the reference symbol ST14 designates a valid number decision step of deciding as to whether any valid identification code is present or not; and ST15 designates a phase difference decision step of deciding as to whether all the valid code identification circuits output the same phase difference. Since the remaining configuration and operation are the same as those of the foregoing embodiment 4, the description thereof is omitted here.

Figure 20:
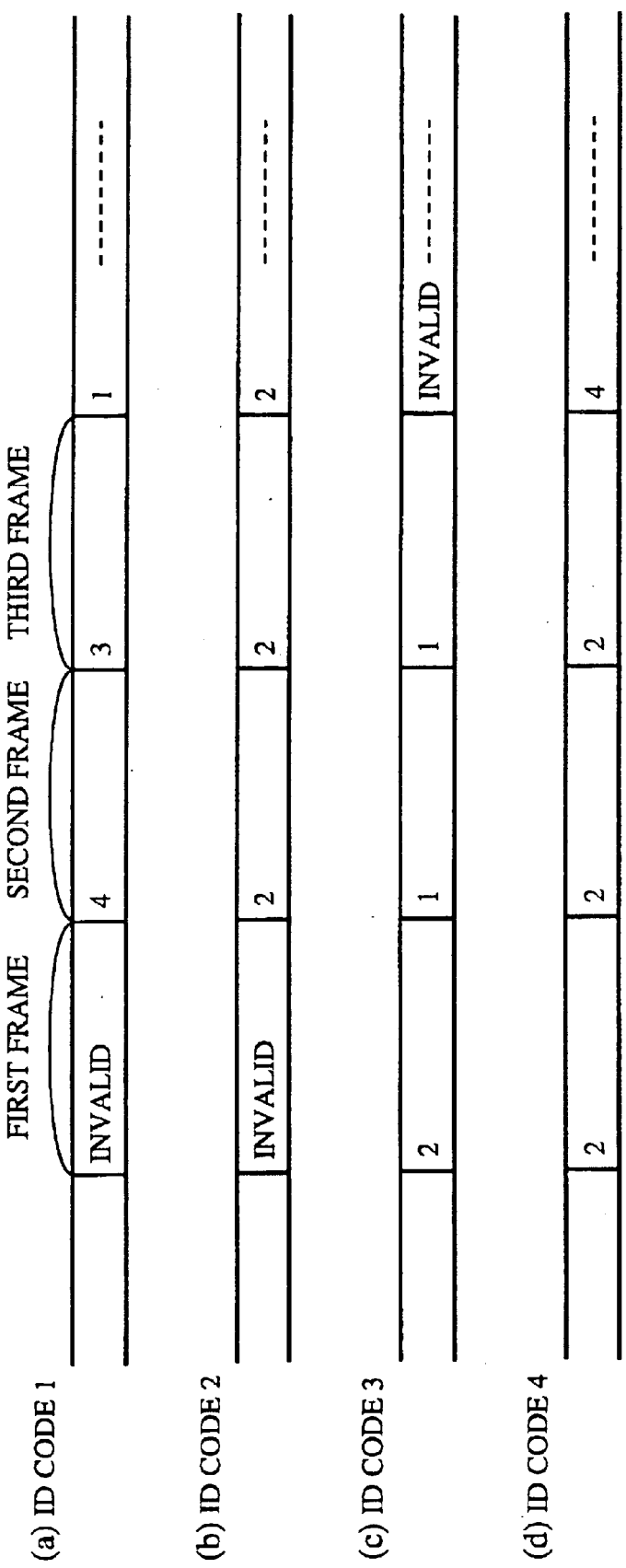
FIG. 20 is a timing chart illustrating a distribution operation by the multiplex system of tributary signals of the embodiment 7 in accordance with the present invention.

FIG. 20 is a timing chart illustrating an example of the distribution operation by the multiplex system of tributary signals of the embodiment 7 in accordance with the present invention. In the present embodiment 7, the switching operation is not carried out in such a state of the decision results as shown in FIG. 7, because not all the valid code identification circuits output the same phase difference.

As described above, according to the present embodiment 7, the output destinations are switched actively even in a rather unstable state to try to stabilize the operation earlier.

Embodiment 8

Figure 21:
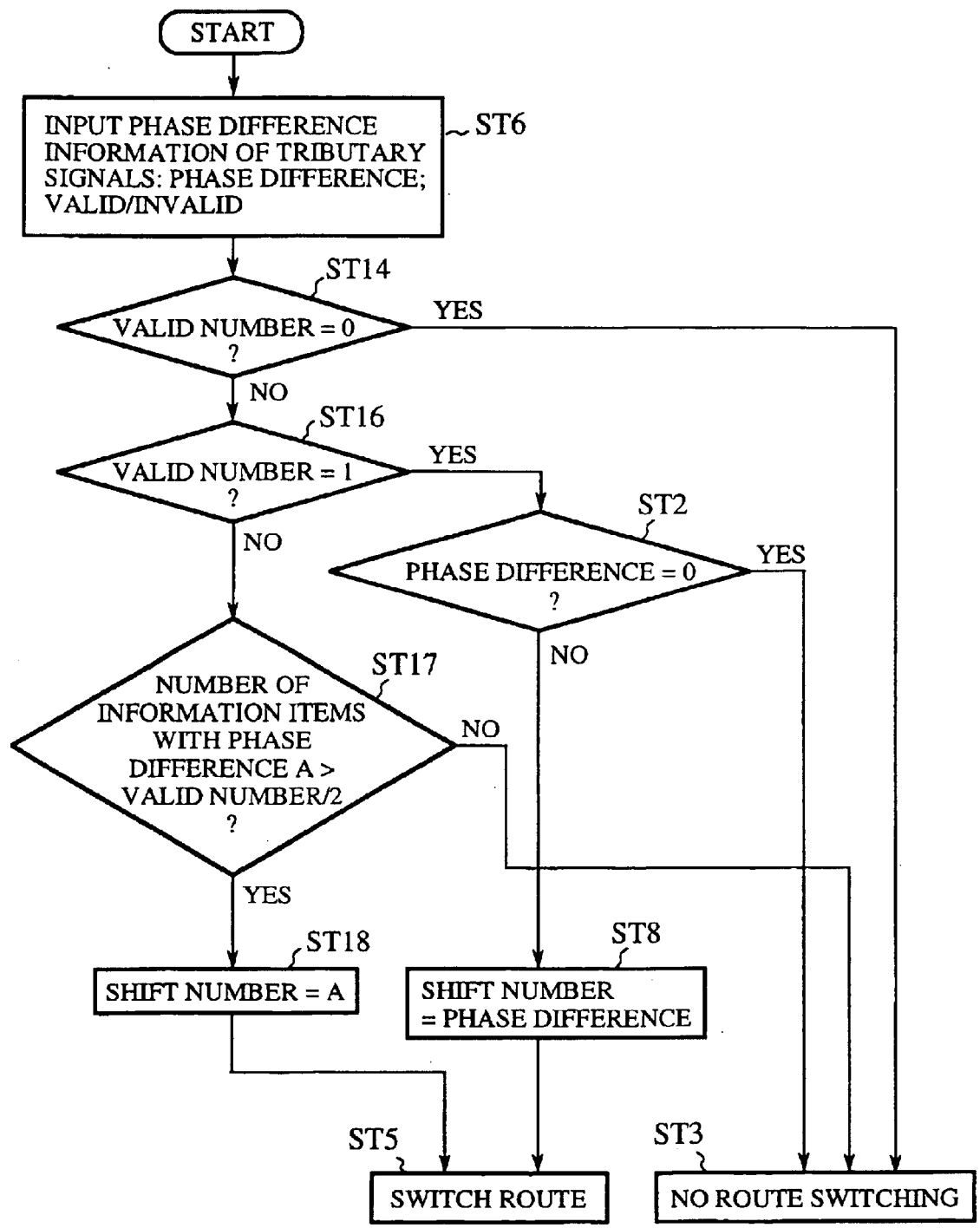
FIG. 21 is a flowchart illustrating the operation executed by the distribution circuit in an embodiment 8 in accordance with the present invention.

FIG. 21 is a flowchart illustrating the operation of the distribution circuit 15 in an embodiment 8 in accordance with the present invention. In this figure, the reference symbol ST16 designates a processing selection step of branching to another processing when the valid number is "1"; ST17 designates a decision step of extracting and selecting the phase difference that agrees in more than half the total valid number; and ST18 designates a shift amount setting step of outputting the phase difference as the shift amount. Since the remaining configuration and operation are the same as those of the foregoing embodiment 3, the description thereof is omitted here.

As described above, according to the present embodiment 8, the distribution circuit 15 does not carry out switching unless the plurality of shift amounts agree with each other in more than half the total valid number. This offers an advantage of being able to prevent the distribution destinations of the tributary signals from being erroneously switched in such a case as the optical cable 3 is unstable and unreliable.

Embodiment 9

Figure 22:
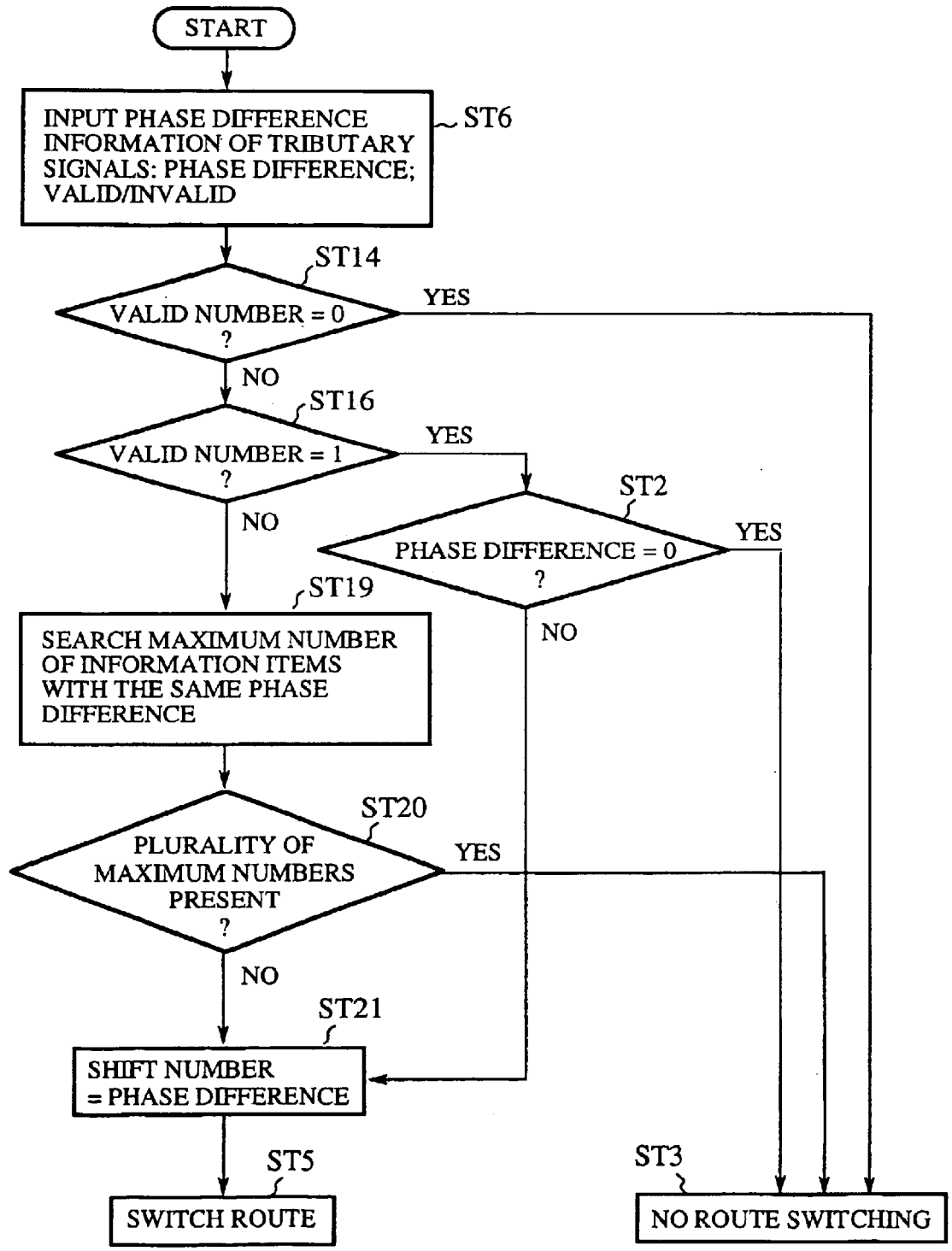
FIG. 22 is a flowchart illustrating the operation executed by the distribution circuit in an embodiment 9 in accordance with the present invention.

FIG. 22 is a flowchart illustrating the operation of the distribution circuit 15 of an embodiment in accordance with the present invention. In this figure, the reference symbol ST19 designates a search step of sorting the plurality of valid phase differences in accordance with their values, and of searching for the set including a maximum number of items; ST20 designates a decision step of deciding as to whether the set with the maximum number of items is only one or not; and ST21 designates a shift amount setting step of outputting the phase difference associated with the set with the maximum matched items as the shift amount. Since the remaining configuration and operation are the same as those of the foregoing embodiment 3, the description thereof is omitted here.

As described above, according to the present embodiment 9, the distribution circuit 15 does not carry out switching unless the set including the maximum number of matched shift amounts becomes only one. This offers an advantage of being able to prevent the distribution destinations of the tributary signals from being erroneously switched in such a case as the optical cable 3 is unstable and unreliable.

In addition, since the switching is decided on the majority basis, it is carried out correctly independently of such causes as a bit error taking place partially in one of the multiplex signals.

Moreover, when the valid number is one, the routes can be switched immediately using this fact as the decision result.

Embodiment 10

Figure 23:
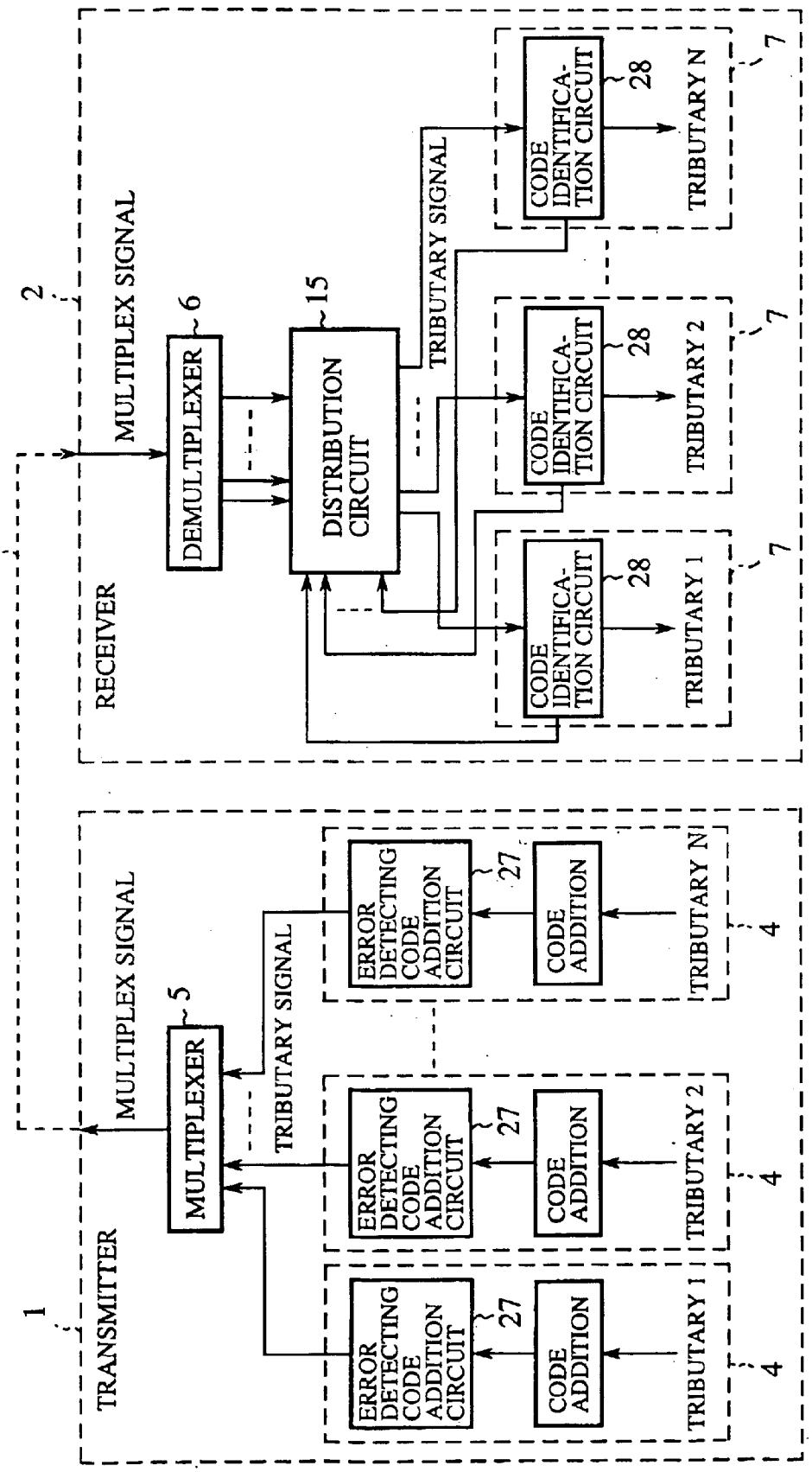
FIG. 23 is a block diagram showing a configuration of the multiplex system of tributary signals of an embodiment 10 in accordance with the present invention.

FIG. 23 is a block diagram showing a configuration of the multiplex system of tributary signals of an embodiment 10 in accordance with the present invention. In this figure, each reference numeral 27 designates an error detecting code addition circuit installed in each of the transmission side tributary circuits 4, . . . , 4 for superimposing over the tributary signal an error detecting code for detecting a bit error or the like in the identification code; 28 designates a code identification circuit installed in each of the receiving side tributary circuits 7, . . . , 7 for extracting the identification code from the tributary signal distributed to the receiving side tributary circuit 7 with detecting an error, and for carrying out the identity detection of the extracted identification code.

Figure 24:
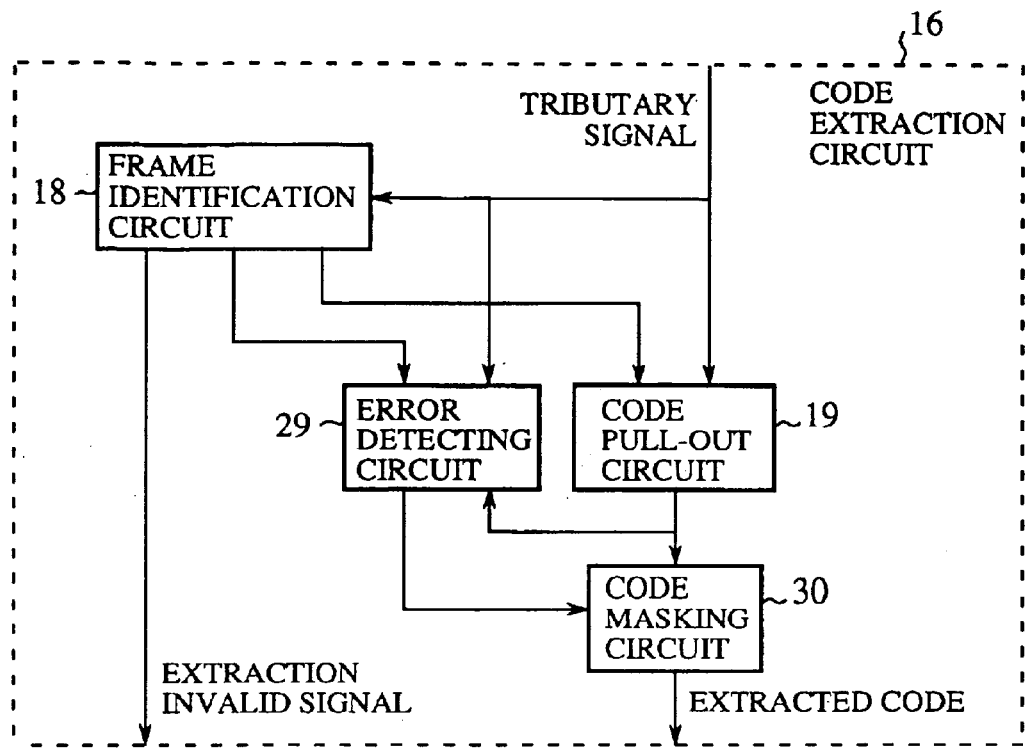
FIG. 24 is a block diagram showing a configuration of a code extraction circuit in a code identification circuit of the embodiment 10 in accordance with the present invention.

FIG. 24 is a block diagram showing a configuration of the code extraction circuit 16 in the code identification circuit 28 in the present embodiment 10 in accordance with the present invention. In this figure, the reference numeral 29 designates an error detecting circuit for detecting an error of the identification code output from the code pull-out circuit 19 using the error detecting code superimposed on the tributary signal; and 30 designates a code masking circuit for receiving from the error detecting circuit 29 its detection result, and for outputting in case of an error a masking code different from any of the identification codes instead of the identification code extracted by the code pull-out circuit 19.

As the error detecting code, it is possible to use an error detecting code generated by even or odd parity check.

Next, the operation of the present embodiment 10 will be described.

In response to the input of the tributary signal to the code extraction circuit 16, the frame identification circuit 18 identifies the frame information of the tributary signal, and outputs the extraction invalid signal when it fails to identify the frame information. Receiving the output of the frame identification circuit 18, the code pull-out circuit 19 extracts the identification code from the tributary signal. The error detecting circuit 29 carries out the error detection of the identification code output from the code pull-out circuit 19 using the error detecting code superimposed on the tributary signal. If the error detection result indicates that an error takes place, the code masking circuit 30 outputs the masking code. On the contrary, if a decision is made that no error takes place, the code masking circuit 30 outputs the extracted identification code.

If the masking code is output, the code identity detection circuits $23a$, . . . , $23n$ halt the output of the identity signals, which can prevent the distribution circuit 15 from carrying out incorrect switching based on the erroneous identification code. Since the remaining configuration and operation are the same as those of the foregoing embodiment 3, the description thereof is omitted here.

According to the present embodiment 10, each transmission side tributary circuit 4 adds not only the identification code and frame information, but also the error detecting code of the identification code; and the code extraction circuit 16 outputs the mask code when it detects that the identification code includes an error on the basis of the error detecting code. Thus, the distribution circuit 15 carries out the switching disregarding the decision result about identification code made by the receiving side tributary circuit 7 that outputs the masking code. This makes it possible to prevent incorrect switching based on the erroneous identification code, and particularly to prevent erroneous operation such as switching all the tributary signals in case of an error taking place in part of the tributary signals. This offers an advantage of being able to improve the system stability and reliability.

According to the present embodiment 10, when any identification code includes an error, the code extraction circuit 16 outputs in place of the identification code the masking code not assigned as the identification codes. Accordingly, the distribution circuit 15 can generate the code difference on the basis of only the correct identification codes, which can prevent the incorrect switching based on the erroneous identification code. In particular, incorrect switching of all the tributary signals can be prevented which can be caused by an error occurring in only part of the tributary signals. This offers an advantage of being able to improve the system stability and reliability.

Embodiment 11

Figure 25:
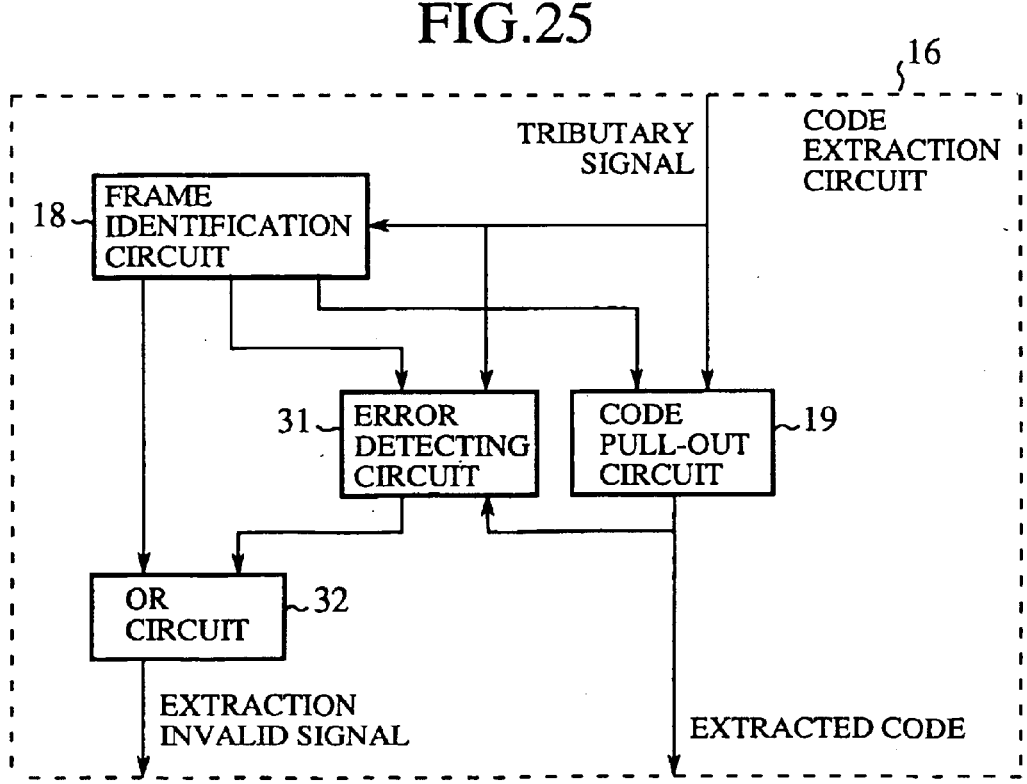
FIG. 25 is a block diagram showing a configuration of a code extraction circuit of an embodiment 11 in accordance with the present invention.

FIG. 25 is a block diagram showing a configuration of the code extraction circuit 16 of an embodiment 11 in accordance with the present invention. In this figure, the reference numeral 31 designates an error detecting circuit for carrying out the error detection of the identification code output from code pull-out circuit 19 using the error detecting code superimposed on the tributary signal, and for outputting the extraction invalid signal when an error is detected; and 32 designates an OR circuit for receiving the extraction invalid signal output from the frame identification circuit 18 and the extraction invalid signal output from the error detecting circuit 31, and for outputting an extraction invalid signal when either of the inputs is supplied.

Next, the operation of the present embodiment 11 will be described.

In response to the input of the tributary signal to each code extraction circuit 16, the frame identification circuit 18 identifies the frame information of the tributary signal, and when failed to identify it, it outputs the extraction invalid signal. The extraction invalid signal is supplied through the OR circuit 32 to the distribution circuit 15 and the like. The code pull-out circuit 19 extracts the identification code from the tributary signal in response the output of the frame identification circuit 18. The error detecting circuit 31 carries out the error detection of the identification code output from the code pull-out circuit 19 using the error detecting code superimposed on the tributary signal. When detecting an error as a result of the error detection, the error detecting circuit 31 supplies the extraction invalid signal through the OR circuit 32 to the distribution circuit 15 and others.

When the extraction invalid signal is output, the distribution circuit 15 establishes the shift amount disregarding the identity signal and identification code associated with the extraction invalid signal. This can prevent the distribution circuit 15 from carrying out incorrect switching based on the erroneous identification code. Since the remaining configuration and operation are the same as those of the foregoing embodiment 10, the description thereof is omitted here.

As described above, according to the present embodiment 11, the code extraction circuit 16 outputs the extraction invalid signal when it cannot correct the identification code on the basis of the error detecting code; and the distribution circuit 15 carries out the switching disregarding the decision result about the identification code by the receiving side tributary circuit 7 that outputs the extraction invalid signal. This can prevent erroneous switching of all the tributary signals which can be caused by an uncorrectable error in the identification code. This offers an advantage of being able to improve the system stability and reliability.

Embodiment 12

Figure 26:
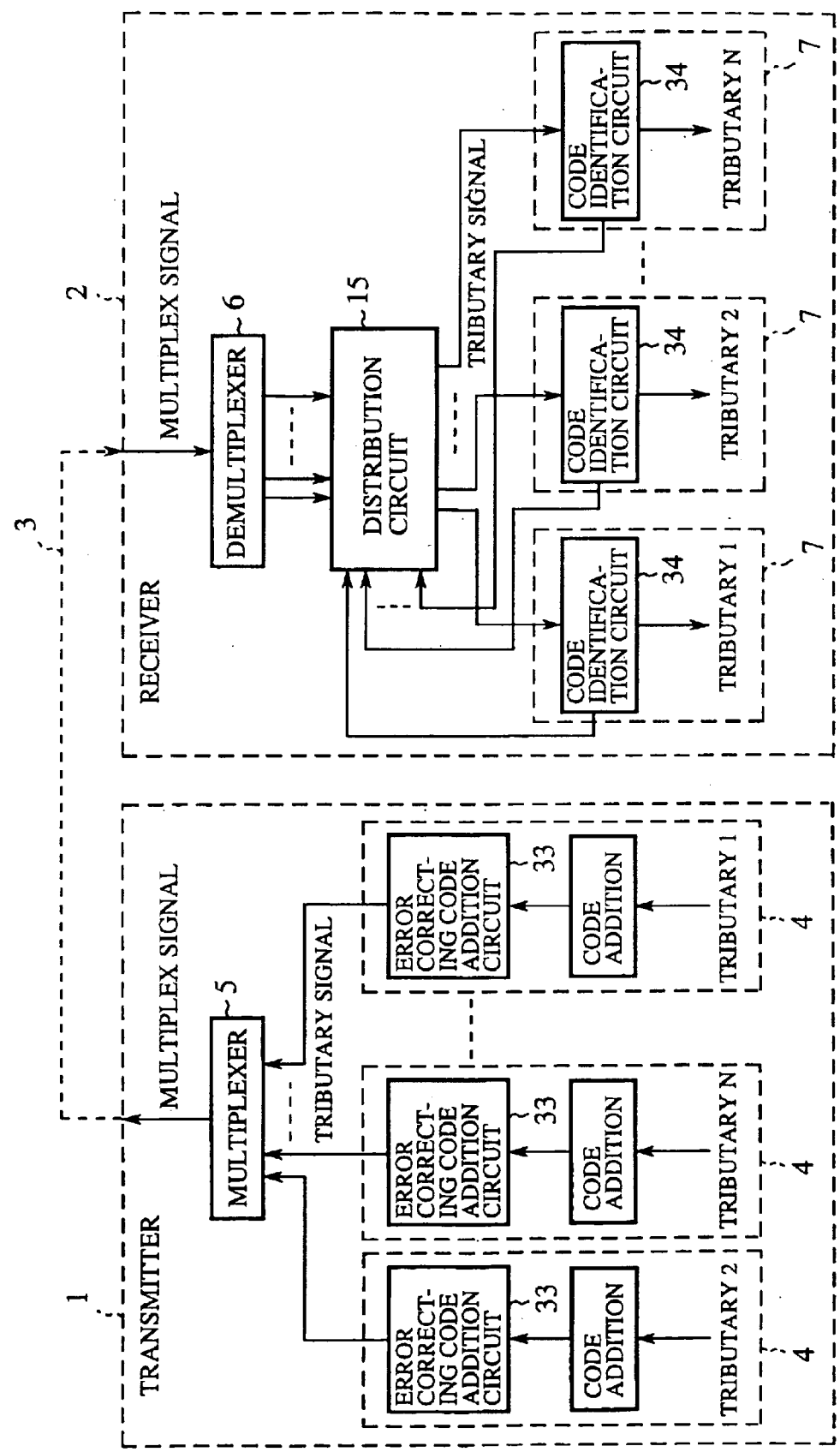
FIG. 26 is a block diagram showing a configuration of the multiplex system of tributary signals of an embodiment 12 in accordance with the present invention.

FIG. 26 is a block diagram showing a configuration of the multiplex system of tributary signals of an embodiment 12 in accordance with the present invention. In this figure, the reference numeral 33 designates an error correcting code addition circuit installed in each of the transmission side tributary circuits 4 for superimposing over the tributary signal an error correcting code for detecting and correcting a bit error or the like in the identification code; and 34 designates a code identification circuit installed in each of the receiving side tributary circuits 7 for extracting the identification code from the tributary signal distributed to the receiving side tributary circuit 7 with correcting the error, and for carrying out the identity detection of the extracted identification code.

Figure 27:
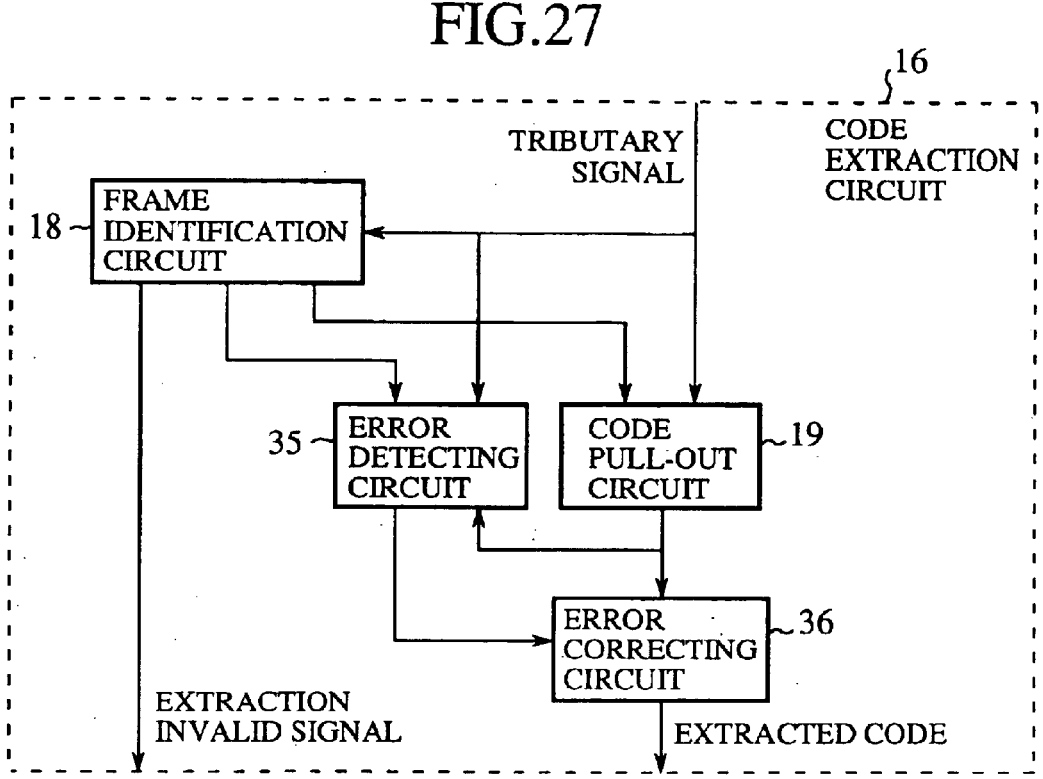
FIG. 27 is a block diagram showing a configuration of a code extraction circuit in a code identification circuit of the embodiment 12 in accordance with the present invention.

FIG. 27 is a block diagram showing a configuration of the code extraction circuit 16 in the code identification circuit 34 in the present embodiment 12 in accordance with the present invention. In this figure, the reference numeral 35 designates an error detecting circuit for detecting an error of the identification code output from the code pull-out circuit 19 using the error correcting code superimposed on the tributary signal; and 36 designates an error correcting circuit for receiving from the error detecting circuit 35 its detection result, and for correcting the identification code in case of an error, thereby outputting the corrected identification code.

As the error correcting code, it is possible to use a syndrome generated by CRC (Cyclic Redundancy Check).

Next, the operation of the present embodiment 12 will be described.

In response to the input of the tributary signal to each code extraction circuit 16, the frame identification circuit 18 identifies the frame information of the tributary signal, and outputs the extraction invalid signal when it fails to identify the frame information. In response to the output of the frame identification circuit 18, the code pull-out circuit 19 extracts the identification code from the tributary signal. The error detecting circuit 35 carries out the error detection of the identification code output from the code pull-out circuit 19 using the error correcting code superimposed on the tributary signal. If the error detection result indicates that an error takes place, the error correcting circuit 36 corrects the identification code extracted by the code pull-out circuit 19, and outputs the corrected identification code.

Since the identification code is thus corrected, the code identity detection circuits 23a, . . . , 23n can make the identity decision based on the corrected identification, which can prevent the distribution circuit 15 from carrying out incorrect switching. Since the remaining configuration and operation are the same as those of the foregoing embodiment 3, the description thereof is omitted here.

As described above, according to the present embodiment 12, the code extraction circuit 16 corrects the identification code on the basis of the error correcting code, and outputs it as the extracted identification code. This makes it possible to reduce the error rate of the identification codes themselves, and to prevent erroneous operation such as switching all the tributary signals in a case where an error takes place in part of the tributary signals. This offers an advantage of being able to improve the system stability and reliability.

Embodiment 13

Figure 28:
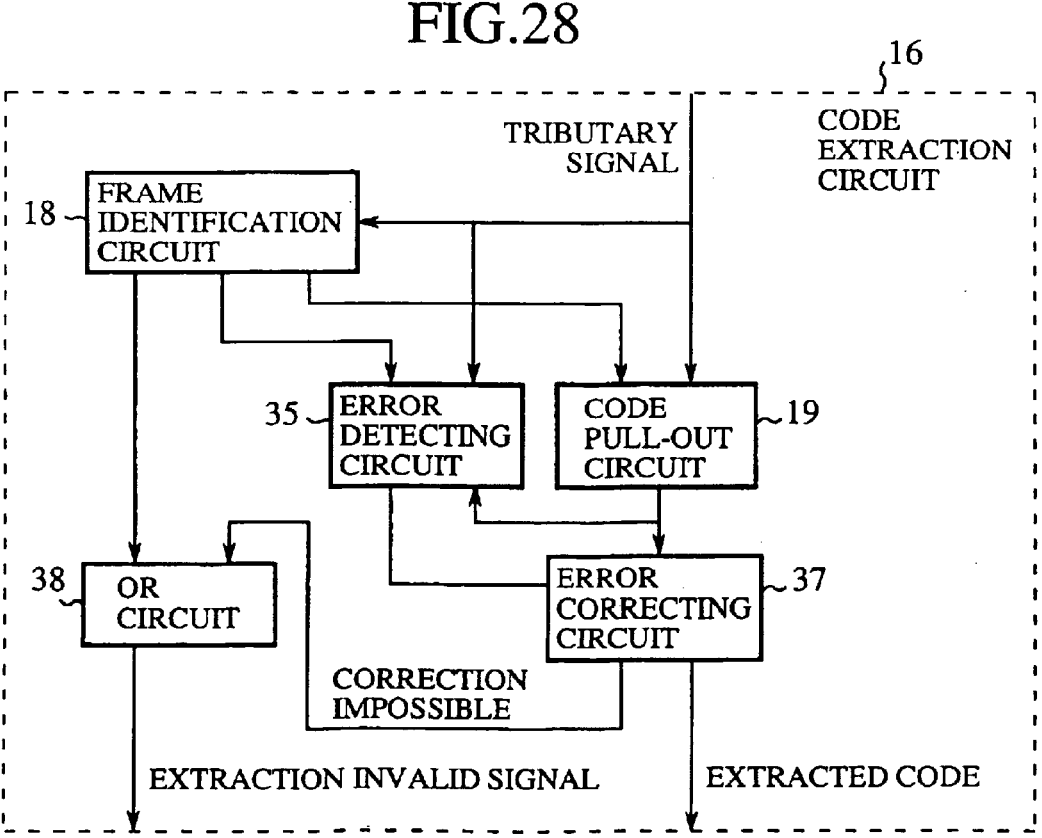
FIG. 28 is a block diagram showing a configuration of a code extraction circuit of an embodiment 13 in accordance with the present invention.
Figure 29:
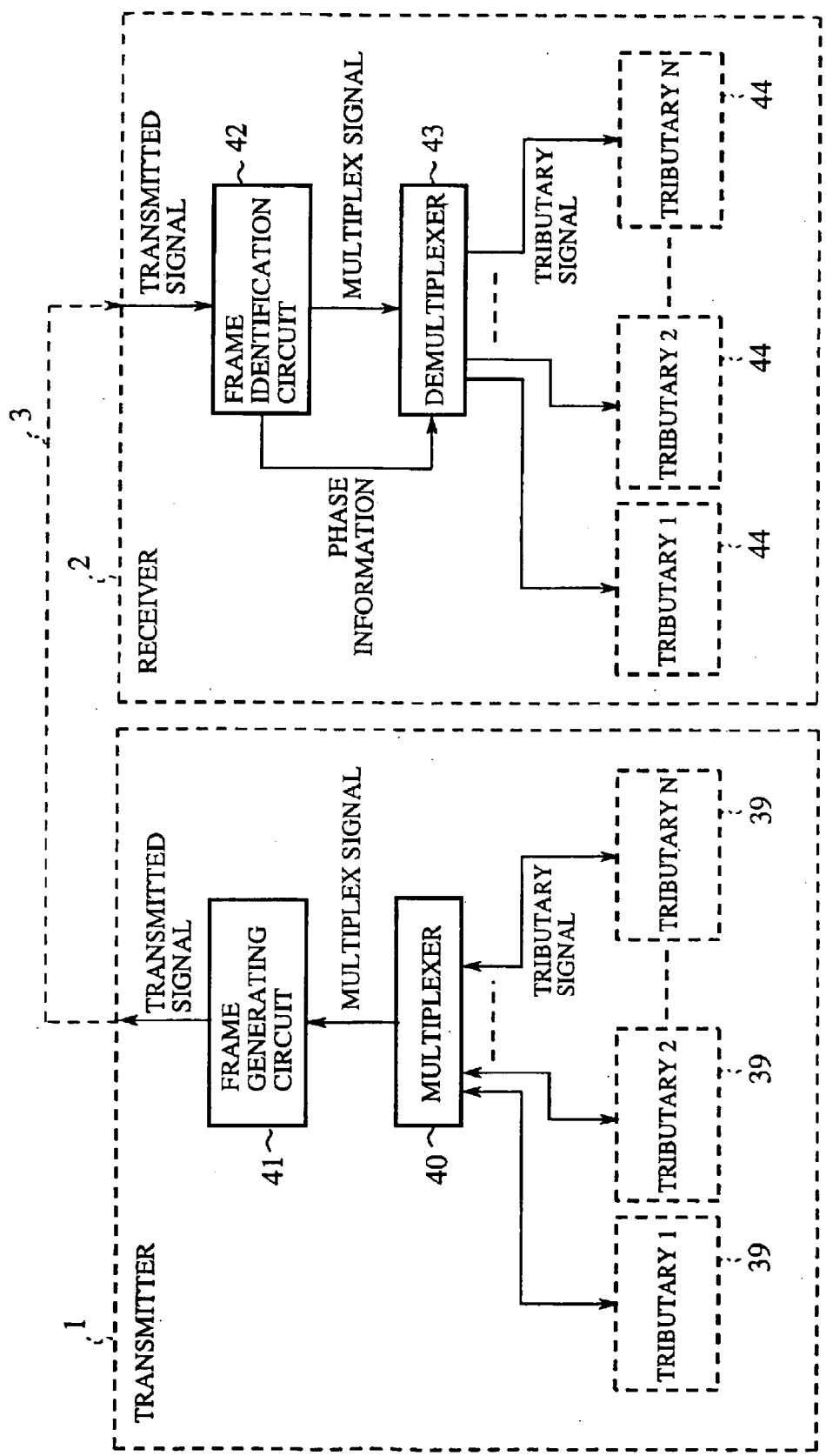
FIG. 29 is a block diagram showing a configuration of a conventional Synchronous Digital Hierarchy system based on a virtual container multiplexing.
Figure 30:
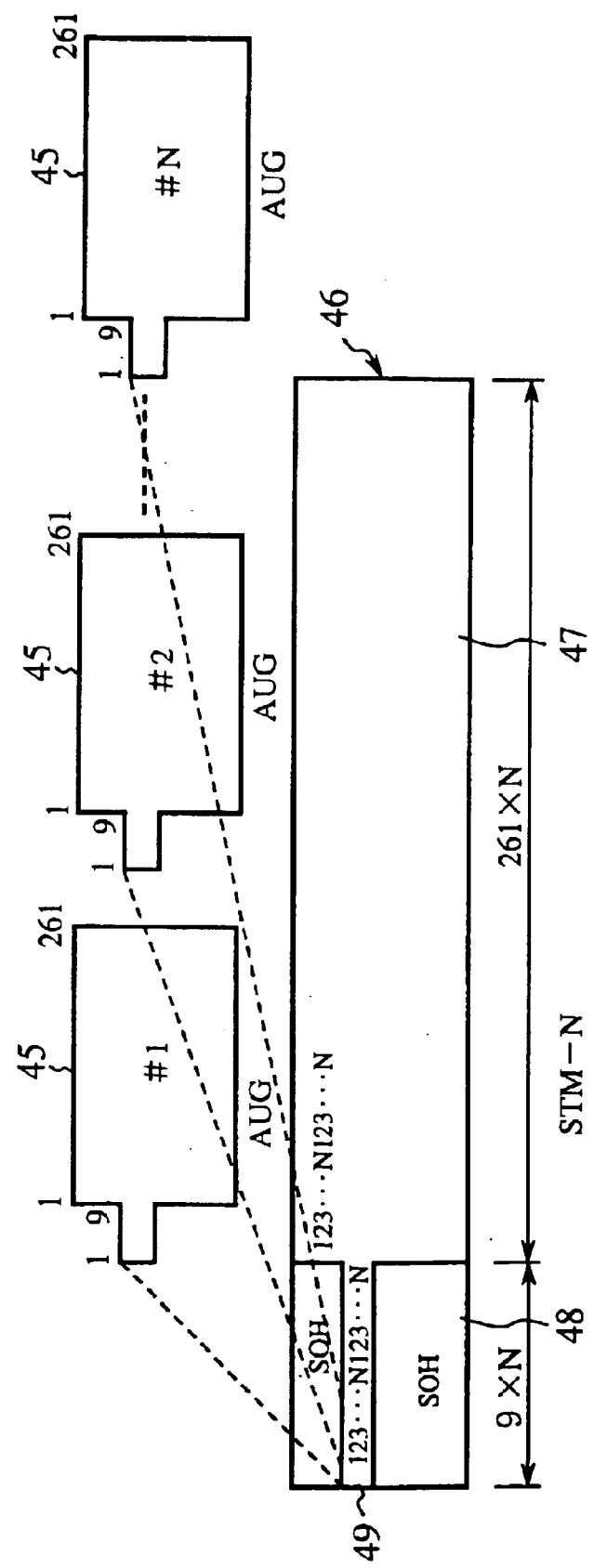
FIG. 30 is a diagram illustrating an STM-N frame employed by the conventional Synchronous Digital Hierarchy system.

FIG. 28 is a block diagram showing a configuration of the code extraction circuit 16 of an embodiment 13 in accordance with the present invention. In this figure, the reference numeral 37 designates an error correcting circuit for carrying out the error correction of the identification code output from code pullout circuit 19 using the error correcting code superimposed on the tributary signal, and for outputting the extraction invalid signal when an error cannot be corrected in spite of the error correcting code; and 32 designates an OR circuit for receiving the extraction invalid signal output from the frame identification circuit 18 and the extraction invalid signal output from the error correcting circuit 37, and for outputting an extraction invalid signal when either of the inputs is supplied.

Next, the operation of the present embodiment 13 will be described.

In response to the input of the tributary signal to each code extraction circuit 16, the frame identification circuit 18 identifies the frame information of the tributary signal, and when it fails to identify it, it outputs the extraction invalid signal. The extraction invalid signal is supplied through the OR circuit 38 to the distribution circuit 15 and the like. The code pull-out circuit 19 extracts the identification code from the tributary signal in response the output of the frame identification circuit 18. The error detecting circuit 35 carries out the error detection of the identification code output from the code pull-out circuit 19 using the error correcting code superimposed on the tributary signal. The error correcting circuit 37 corrects the identification code if it includes an error. When the error cannot be corrected in spite of the error correction, the error correcting circuit 37 supplies the extraction invalid signal through the OR circuit 38 to the distribution circuit 15 and others.

In response to the output of the extraction invalid signal, the distribution circuit 15 establishes the shift amount disregarding the identity signal and identification code associated with the extraction invalid signal. This can prevent the distribution circuit 15 from carrying out incorrect switching based on the erroneous identification code. Since the remaining configuration and operation are the same as those of the foregoing embodiment 12, the description thereof is omitted here.

As described above, according to the present embodiment 13, the code extraction circuit 16 outputs the extraction invalid signal when it cannot correct the identification code on the basis of the error correcting code; and the distribution circuit 15 carries out the switching disregarding the decision result about the identification code by the receiving side tributary circuit 7 that outputs the extraction invalid signal. This can prevent erroneous switching of all the tributary signals which can be caused by an uncorrectable error in the identification code. This offers an advantage of being able to improve the system stability and reliability.

Although the foregoing embodiments carry out the switching immediately after detecting the matching of the identification code with the reference code by outputting the identity signal and the like, the present invention is not limited to this. For example, a configuration can be implemented in which the path switching can be carried out for the first time when the identification code matching takes place consecutively multiple times. This can prevent the incorrect switching caused by a temporary bit error, and improve the system stability and reliability.

Comparing the foregoing embodiments, although the switching processing based on FIG. 21 may take longer time to complete correct switching than the switching processing based on FIG. 22 when the circuit quality of the optical cable 3 is good, it can carry out the correct switching of the remaining tributary signals even when part of the tributary signals or identification codes cannot be transmitted normally. Being compared to the two cases above, although the switching processing based on FIG. 19 can take still longer time to complete the route switching, it can not only further reduce the probability to carry out erroneous route switching, but also reduce the circuit scale for implementing the processing. In addition, being compared to the three cases above, although the switching processing based on FIG. 18 can take still longer time to complete the route switching, it can further reduce not only the probability to carry out erroneous route switching, but also the circuit scale for implementing the processing.

On the other hand, since the switching processing based on FIG. 17 makes a phase difference decision simpler than the switching processings from FIG. 18 to FIG. 22, it may carry out erroneous route switching slightly more often than they do. However, it can complete the route switching more quickly.

Furthermore, the foregoing embodiments 1 and 2 can have a circuit scale smaller than that of the other embodiments because they include only one code identity detection circuit 11 or 17. In addition, although the embodiment 1 carries out the phase switching based on the fixed value, the other embodiments decide the phase difference, and perform the switching for canceling it. This will increase the probability that the other embodiments can establish the correct connection of the signal path more quickly.

Moreover, since the embodiments 10–13 carry out the error detection or error correction of the identification code, they can prevent incorrect switching based on the erroneously extracted identification code. This makes it possible to implement more stable switching even when the circuit quality is bad. This is particularly effective when part of the tributary signals or identification codes has an error. Although the error correction can delay the switching by the time required for that processing, it can implement each switching operation on the basis of the correct identification codes with their error removed. As a result, it can establish the connection of the normal signal path more quickly in such a condition that may raise an error.

What is claimed is:

1. A multiplex system of tributary signals including a transmitter for multiplexing a plurality of tributary signals supplied from a plurality of upstream signal paths onto a multiplex signal to be transmitted at every fixed interval, a receiver for demultiplexing the multiplex signal received onto a plurality of tributary signals to be supplied to a plurality of downstream signal paths, and a main signal path for transmitting the multiplex signal from the transmitter to the receiver, said transmitter comprising:

a plurality of transmission side tributary circuits installed as many as the number of the upstream signal paths for assigning to individual tributary signals frame information and different identification codes without including section overhead information for the multiplex signal, the frame information indicating a unit of the tributary signals in the multiplex signal, and the different identification codes being associated with the upstream signal paths, respectively; and a multiplexer for multiplexing outputs of said plurality of transmission side tributary circuits onto the multiplex signal to be supplied to the main signal path at every fixed interval, and said receiver comprising:

a demultiplexer for demultiplexing the multiplex signal onto a same number of tributary signals as the tributary signals multiplexed;

a plurality of receiving side tributary circuits installed as many as the number of tributary signals multiplexed onto multiplex signal for supplying the downstream transmission paths with the tributary signals output from said demultiplexer, at least one of said plurality of receiving side tributary circuits detecting its frame information and making a decision of its identification code in response to the frame information detected; and a distribution circuit installed between said demultiplexer and said receiving side tributary circuits for carry out switching of output destinations of the tributary signals supplied from said demultiplexer, the switching being implemented for the each unit of the tributary signals in the multiplex signal in response to a decision result of said at least one of said plurality of receiving side tributary circuits.

2. The multiplex system of tributary signals according to claim 1, wherein said multiplexer outputs the plurality of tributary signals supplied from said plurality of transmission side tributary circuits in a predetermined order, and said distribution circuit carries out shifting and switching of the output destinations of the tributary signals to said receiving side tributary circuits with maintaining its demultiplexing order.

3. The multiplex system of tributary signals according to claim 1, wherein said at least one of said plurality of receiving side tributary circuits for deciding the identification code comprises a code extraction circuit for extracting the identification code from at least one of the tributary signals, and a code identity detection circuit for comparing the identification code extracted by said code extraction circuit with a common identification code to output a match/mismatch decision result, and wherein said distribution circuit carries out switching of the output destinations of the tributary signals in response to the match/mismatch decision result.

4. The multiplex system of tributary signals according to claim 1, wherein said at least one of said plurality of receiving side tributary circuits for deciding the identification code comprises a code extraction circuit for extracting the identification code from at least one of the tributary signals, and wherein said distribution circuit compares the identification code extracted with the identification code of said at least one of said plurality of receiving side tributary circuits, and carries out switching of the output destinations of the tributary signals in response to a difference between the two identification codes compared.

5. A multiplex system of tributary signals including a transmitter for multiplexing a plurality of tributary signals supplied from a plurality of upstream signal paths onto a multiplex signal to be transmitted at every fixed interval, a receiver for demultiplexing the multiplex signal received onto a plurality of tributary signals to be supplied to a plurality of downstream signal paths, and a main signal path for transmitting the multiplex signal from the transmitter to the receiver, said transmitter comprising:

a plurality of transmission side tributary circuits installed as many as the number of the upstream signal paths for assigning to individual tributary signals frame information and different identification codes, the frame information indicating a unit of the tributary signals in the multiplex signal, and the different identification codes being associated with the upstream signal paths, respectively; and a multiplexer for multiplexing outputs of said plurality of transmission side tributary circuits onto the multiplex signal to be supplied to the main signal path at every fixed interval, and said receiver comprising:

a demultiplexer for demultiplexing the multiplex signal onto a same number of tributary signals as the tributary signals multiplexed;

a plurality of receiving side tributary circuits installed as many as the number of tributary signals multiplexed onto multiplex signal for supplying the downstream transmission paths with the tributary signals output from said demultiplexer, at least one of said plurality of receiving side tributary circuits detecting its frame information and making a decision of its identification code in response to the frame information detected; and a distribution circuit installed between said demultiplexer and said receiving side tributary circuits for carry out switching of output destinations of the tributary signals supplied from said demultiplexer, the switching being implemented for the each unit of the tributary signals in the multiplex signal in response to a decision result of said at least one of said plurality of receiving side tributary circuits;

wherein said at least one of said plurality of receiving side tributary circuits for deciding the identification code comprises a code extraction circuit for extracting the identification code from at least one of the tributary signals, and a code phase difference decision circuit for comparing the identification code extracted by said code extraction circuit with a predetermined identification code assigned to said at least one of said plurality of receiving side tributary circuits to output a difference as a decision result, and wherein said distribution circuit carries out switching of the output destinations of the tributary signals in response to the difference.

6. The multiplex system of tributary signals according to claim 5, wherein said code phase difference decision circuit comprises a plurality of code identity detection circuits for comparing the extracted identification code with all identification codes associated with the downstream signal paths, and a collection circuit for acquiring phase differences of the tributary signals in a multiplexed order in response to outputs of said plurality of code identity detection circuits and the multiplexed order of the tributary signals.

7. The multiplex system of tributary signals according to claim 5, wherein said code extraction circuit outputs an extraction invalid signal when it cannot identify the frame information in the tributary signal supplied from said distribution circuit, and wherein said distribution circuit carries out switching disregarding a decision result of the identification code by the receiving side tributary circuit that outputs the extraction invalid signal.

8. The multiplex system of tributary signals according to claim 5, wherein said plurality of transmission side tributary circuits each comprise a circuit for adding besides the identification code and frame information one of an error detecting code and an error correcting code of the identification code, and wherein said code extraction circuit further comprises an error detecting circuit for outputting an invalid signal when it detects an error in the identification code using one of the error detecting code and error correcting code, and wherein said distribution circuit carries out switching disregarding a decision result of the identification code by the receiving side tributary circuit that outputs the invalid signal.

9. The multiplex system of tributary signals according to claim 8, wherein said code extraction circuit outputs instead of the extracted identification code a masking code, which is not assigned as any of the predetermined identification codes, as the invalid signal when the extracted identification code includes an error.

10. The multiplex system of tributary signals according to claim 8, wherein said code extraction circuit further comprises an error correcting circuit for correcting the extracted identification code in response to the error correcting code to output the extracted identification code passing through the error correction as the extracted identification code.

11. The multiplex system of tributary signals according to claim 8, wherein said code extraction circuit outputs an extraction invalid signal as the invalid signal when it cannot correct the identification code in response to the error correcting code, and wherein said distribution circuit carries out switching disregarding a decision result of the extracted identification code by the receiving side tributary circuit that outputs the extraction invalid signal.

12. The multiplex system of tributary signals according to claim 2, wherein said distribution circuit, which switches the output destinations of the tributary signals in response to a plurality of decision results by said receiving side tributary circuits, comprises a phase difference detection circuit for generating a plurality of shift amounts from the decision results; a phase difference decision circuit for selecting a most likely shift amount among the plurality of shift amounts; and a switching circuit for carrying out shifting and switching by the selected shift amount.

13. The multiplex system of tributary signals according to claim 12, wherein said distribution circuit halts the switching when the most likely shift amount is not unique.

14. The multiplex system of tributary signals according to claim 12, wherein said distribution circuit halts its switching unless the plurality of shift amounts that agree with each other hold a majority.

15. The multiplex system of tributary signals according to claim 12, wherein said distribution circuit halts its switching unless all the plurality of shift amounts agree with each other.

16. The multiplex system of tributary signals according to claim 12, wherein said distribution circuit selects the shift amount excluding a shift amount associated with an extraction invalid signal.

17. The multiplex system of tributary signals according to claim 12, wherein said distribution circuit halts its switching when extraction invalid signals hold a majority.

18. The multiplex system of tributary signals according to claim 12, wherein said distribution circuit halts its switching when at least one extraction invalid signal is present.

19. A multiplex transmission method of tributary signals comprising the steps of:

adding at a transmitting side frame information and different identification codes, without including section overhead information for the multiplex signal, to tributary signals supplied from a plurality of upstream signal paths, the frame information indicating a unit of the tributary signals to be transmitted, and the identification codes being different for the upstream signal paths;

multiplexing at the transmitting side the tributary signals passing through the step of adding onto a multiplex signal to be transmitted;

demultiplexing at a receiving side the multiplex signal onto a plurality of tributary signals by using the frame information; and deciding in response to the identification codes downstream signal paths to which the tributary signals are supplied.

20. A system for multiplexing a plurality of signals, comprising:

a transmitter including:

a plurality of tributary circuits, each circuit for one of a plurality of signal paths, for assigning to individual tributary signals frame information and different identification codes without including section overhead information for a multiplex signal, the frame information indicating a unit of the tributary signals in the multiplex signal, and the different identification codes being associated with the transmission signal paths, respectively; and a multiplexer for multiplexing outputs of said plurality of tributary circuits onto the multiplex signal to be supplied to a main signal path at a fixed interval.

21. A method for multiplexing a plurality of signals, comprising:

assigning individual tributary signals, each associated with one of a plurality of transmission signal paths, frame information and different identification codes without including section overhead information for a multiplex signal, the frame information indicating a unit of the tributary signals in the multiplex signal, and the different identification codes being associated with the transmission signal paths, respectively; and multiplexing said tributary signals onto the multiplex signal to be supplied to a main signal path at a fixed interval.

22. A system for demultiplexing a plurality of signals, comprising:

a receiver including:

a demultiplexer for demultiplexing a multiplex signal onto a plurality of tributary signals;

a plurality of tributary circuits, each circuit for one of the plurality of tributary signals, for supplying each one of a plurality of receiving paths with the tributary signals output from said demultiplexer, at least one of said plurality of tributary circuits detecting tributary signal frame information and determining an identification code for the tributary signal in response to the frame information detected; and a distribution circuit, arranged between said demultiplexer and said plurality of tributary circuits, for switching of output destinations of the tributary signals supplied from said demultiplexer, the switching being performed for each unit of the tributary signals in the multiplex signal in response to a decision result of said at least one of said plurality of tributary circuits.

23. A method for demultiplexing a plurality of signals, comprising:

demultiplexing a multiplex signal onto a plurality of tributary signals;

supplying each one of a plurality of receiving paths with the tributary signals output from said demultiplexer;

detecting tributary signal frame information and determining an identification code for the tributary signal in response to the frame information detected; and switching, after said demultiplexing, output destinations of the tributary signals, the switching being performed for each unit of the tributary signals in the multiplex signal in response to a decision result of said at least one of said plurality of tributary circuits.

* * * * *